US008930078B2

(12) United States Patent
Nishimori

(10) Patent No.: US 8,930,078 B2
(45) Date of Patent: Jan. 6, 2015

(54) VEHICLE AND STEERING APPARATUS

(71) Applicant: Honda Motor Co., Ltd., Tokyo (JP)

(72) Inventor: Takashi Nishimori, Shimotsuke (JP)

(73) Assignee: Honda Motor Co., Ltd., Tokyo (JP)

( * ) Notice: Subject to any disclaimer, the term of this patent is extended or adjusted under 35 U.S.C. 154(b) by 38 days.

(21) Appl. No.: 13/749,311

(22) Filed: Jan. 24, 2013

(65) Prior Publication Data

US 2013/0190986 A1   Jul. 25, 2013

(30) Foreign Application Priority Data

Jan. 25, 2012   (JP) ................................ 2012-012580

(51) Int. Cl.
| | | |
|---|---|---|
| A01B 69/00 | (2006.01) | |
| B62D 6/00 | (2006.01) | |
| B60K 6/52 | (2007.10) | |
| B60W 10/06 | (2006.01) | |
| B60W 10/20 | (2006.01) | |
| B60K 23/08 | (2006.01) | |

(52) U.S. Cl.
CPC ...... *B62D 6/00* (2013.01); *B62D 6/007* (2013.01); *B60K 6/52* (2013.01); *B60W 10/06* (2013.01); *B60W 10/20* (2013.01); *B60K 2023/0858* (2013.01)
USPC .......................................................... 701/41

(58) Field of Classification Search
CPC ............ B62D 5/00; B62D 5/06; B60K 23/08; B60K 23/08
USPC .......................................................... 701/41
See application file for complete search history.

(56) References Cited

U.S. PATENT DOCUMENTS

| | | | |
|---|---|---|---|
| 2003/0217885 A1 | 11/2003 | Aoki et al. | |
| 2005/0257993 A1 | 11/2005 | Inui et al. | |
| 2010/0174442 A1 | 7/2010 | Nishimori | |
| 2011/0048840 A1* | 3/2011 | Gagnon et al. | ................ 180/446 |
| 2012/0015772 A1 | 1/2012 | Kira et al. | |

FOREIGN PATENT DOCUMENTS

| | | |
|---|---|---|
| JP | 61-207274 A | 9/1986 |
| JP | 63-116982 A | 5/1988 |
| JP | 05-058317 A | 3/1993 |

(Continued)

OTHER PUBLICATIONS

Office Action, Japanese Patent Application No. 2012-012580 mailing date Dec. 3, 2013.

(Continued)

*Primary Examiner* — James Trammell
*Assistant Examiner* — Michael D Lang
(74) *Attorney, Agent, or Firm* — Westerman, Hattori, Daniels & Adrian, LLP

(57) ABSTRACT

A vehicle has a rear wheel drive device for driving rear wheels independently of a front wheel drive device. A drive mode control unit performs at least one of a first switching operation for switching between a front-wheel-only-drive mode and a rear-wheel-only-drive mode, a second switching operation for switching between a composite drive mode and the rear-wheel-only-drive mode, and a third switching operation for switching between the composite drive mode and the front-wheel-only-drive mode. When the drive mode control unit performs any one of the first switching operation, the second switching operation, and the third switching operation, an assistive force controller of the steering apparatus changes a control process for controlling a steering assistive force.

12 Claims, 14 Drawing Sheets

(56) References Cited

FOREIGN PATENT DOCUMENTS

| | | | |
|---|---|---|---|
| JP | 06-263050 | A | 9/1994 |
| JP | 2003-129880 | A | 5/2003 |
| JP | 2003-220964 | A | 8/2003 |
| JP | 2006-224804 | A | 8/2006 |
| JP | 2006-256542 | A | 9/2006 |
| JP | 2009-056994 | A | 3/2009 |
| JP | 2009-090817 | A | 4/2009 |
| JP | 2009-214711 | A | 9/2009 |
| JP | 2010-052525 | A | 3/2010 |
| JP | 2010-064544 | A | 3/2010 |
| JP | 2010-158938 | A | 7/2010 |

OTHER PUBLICATIONS

Japanese Notice of Allowance dated Jul. 1, 2014, issued in corresponding Japanese Patent Application No. 2012-012580, w/ English Partial Translation (4 pages).

Office Action dated Oct. 22, 2014, issued in corresponding German Patent Application No. 102013201207.1, with English Translation (11 pages).

* cited by examiner

FIG. 6
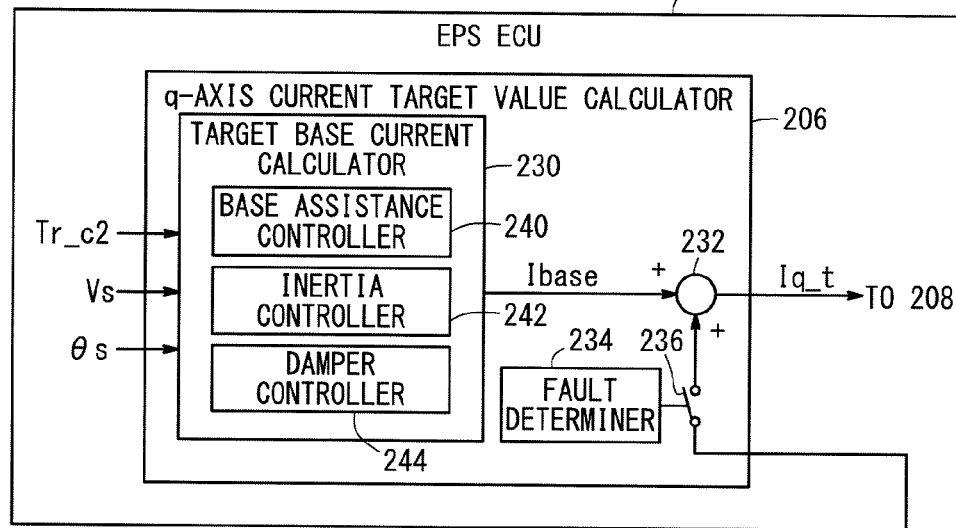
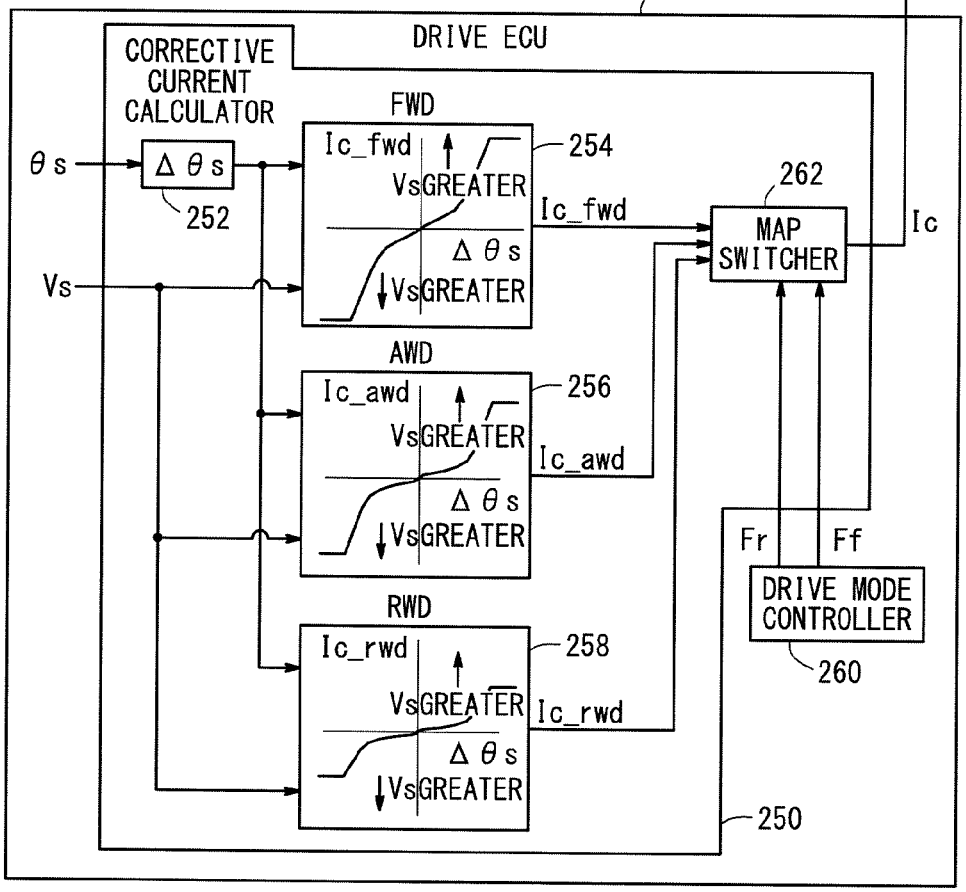

VEHICLE AND STEERING APPARATUS

CROSS-REFERENCE TO RELATED APPLICATION

This application is based upon and claims the benefit of priority from Japanese Patent Application No. 2012-012580 filed on Jan. 25, 2012, the contents of which are incorporated herein by reference.

BACKGROUND OF THE INVENTION

1. Field of the Invention

The present invention relates to a vehicle, which is capable of switching between a front-wheel-drive mode and a rear-wheel-drive mode, as well as to a steering apparatus for use in such a vehicle.

2. Description of the Related Art

There has been proposed in the art an electric power steering apparatus for changing a force that assists the driver of the vehicle in steering the wheel, depending on a state of switching between a four-wheel-drive mode and a two-wheel-drive mode (see Japanese Laid-Open Patent Publication No. 61-207274, hereinafter referred to as "JP61-207274A", and Japanese Laid-Open Patent Publication No. 63-116982, hereinafter referred to as "JP63-116982A").

According to JP61-207274A, a ratio of a steering assistive force to a steering force is changed depending on the four-wheel-drive mode or the two-wheel-drive mode (see claims). As disclosed in JP61-207274A, an electrically operated power steering apparatus is premised on a four-wheel-drive vehicle, which is based on a front-engine rear-wheel-drive vehicle (FR vehicle) that drives the rear wheels at all times, and a four-wheel-drive vehicle, which is based on a front-engine front-wheel-drive vehicle (FR vehicle) that drives the front wheels at all times.

According to JP63-116982A, an electrically operated power steering apparatus includes a solenoid-operated valve for controlling a steering force depending on the running state of the vehicle, and a selector for selecting a four-wheel-drive mode or a two-wheel-drive mode, wherein the solenoid-operated valve is controlled based on a signal from the selector (see claims). As disclosed in JP63-116982A, the four-wheel-drive mode or the two-wheel-drive mode is selected by engaging or disengaging a solenoid-operated clutch in order to change paths along which a drive force from an engine 10 is transmitted (see FIG. 2, page 3, lower left column, lines 2 through 4 to page 3, lower left column, lines 15 through 18).

There has also been proposed a four-wheel-drive vehicle, which is capable of independently driving the front wheels and the rear wheels (see U.S. Published Patent Application No. 2012/0015772, hereinafter referred to as "US2012/0015772A1"). According to US2012/0015772A1, a drive unit 6, in which an internal combustion engine 4 and an electric motor 5 are arranged in series, drives the front wheels Wf, whereas electric motors 2A, 2B drive the rear wheels Wr (see FIG. 1, paragraph [0084]).

According to JP61-207274A and JP63-116982A, the front wheels and the rear wheels are driven by a single drive source, with at least the front wheels or the rear wheels being driven at all times. In particular, therefore, according to JP61-207274A and JP63-116982A, nothing is discussed concerning the application of a steering assistive force in a vehicle configuration in which the front wheels and the rear wheels are driven independently of each other. For example, JP61-207274A and JP63-116982A disclose nothing concerning the application of a steering assistive force upon switching between a mode in which only the front wheels are driven and a mode in which only the rear wheels are driven.

SUMMARY OF THE INVENTION

It is an object of the present invention to provide a vehicle and a steering apparatus, which are capable of achieving a more appropriate steering performance in a vehicle configuration in which the front wheels and the rear wheels are driven independently of each other.

According to the present invention, there is provided a vehicle comprising a front wheel drive device for driving front wheels, a rear wheel drive device for driving rear wheels independently of the front wheel drive device, a drive mode control unit for controlling the front wheel drive device and the rear wheel drive device to control drive modes of the front wheels and the rear wheels, and a steering apparatus for steering steerable wheels, which are at least the front wheels or the rear wheels. The drive mode control unit performs at least one of a first switching operation for switching between a front-wheel-only-drive mode in which only the front wheels are driven and a rear-wheel-only-drive mode in which only the rear wheels are driven, a second switching operation for switching between a composite drive mode in which both the front wheels and the rear wheels are driven and the rear-wheel-only-drive mode, and a third switching operation for switching between the composite drive mode and the front-wheel-only-drive mode. The steering apparatus further includes manual steering means that manually steers the steerable wheels, assistive force generating means, which generates a steering assistive force acting in a same direction as or in an opposite direction to a steering force applied to the manual steering means, for assisting in steering the steerable wheels with the manual steering means, and assistive force control means that controls the steering assistive force. When the drive mode control unit performs any one of the first switching operation, the second switching operation, and the third switching operation, the assistive force control means changes a control process thereof for controlling the steering assistive force.

According to the present invention, when one of the front-wheel-only-drive mode, the rear-wheel-only-drive mode, and the composite drive mode is changed to another mode, the control process for controlling the steering assistive force is changed. The vehicle allows the driver to feel natural about the way in which the vehicle is steered, or alerts the driver concerning the change of the modes, so that the driver can steer the vehicle appropriately.

When the front-wheel-only-drive mode and the rear-wheel-only-drive mode are switched, for example, a self-aligning torque, which is applied to the steerable wheels, changes depending on whether or not a drive force is applied to the steerable wheels when the vehicle corners, which tends to make the driver feel strange or uncomfortable about the way in which the vehicle is steered. With the present invention, the driver can feel natural about the way in which the vehicle is steered, assuming that the control process for controlling the steering assistive force is changed to minimize a change in the self-aligning torque upon switching between the front-wheel-only-drive mode and the rear-wheel-only-drive mode (first switching operation).

When the front-wheel-only-drive mode and the composite drive mode are switched, for example, a change in the self-aligning torque is relatively small. If the control process for controlling the steering assistive force is changed in order to intensify the change in the self-aligning torque, then it is possible to alert the driver concerning switching between the modes.

In addition, according to the present invention, the front wheels and the rear wheels are driven independently of each other. Therefore, it is possible to control the drive force for the front wheels and the drive force for the rear wheels more finely than if only a single drive source (engine or the like) were used for driving the vehicle in the front-wheel-only-drive mode, the rear-wheel-only-drive mode, and the composite drive mode. By controlling the steering assistive force finely, and thereby making the driver feel natural about the way in which the vehicle is steered, or alerting the driver concerning switching between drive modes, it is possible for the driver to steer the vehicle appropriately.

The steering apparatus may include manually steered state acquiring means, which acquires an operated state of the manual steering means, and vehicle speed acquiring means, which acquires a vehicle speed of the vehicle. The assistive force control means may calculate a target steering assistive quantity using a target base steering assistive quantity based on the operated state of the manual steering means and the vehicle speed, and a corrective quantity based on one of the drive modes. Further, when the drive mode control unit performs any one of the first switching operation, the second switching operation, and the third switching operation, the assistive force control means may change the corrective quantity, and may calculate the target steering assistive quantity using the target base steering assistive quantity and the changed corrective quantity.

Even if the corrective quantity cannot be calculated, the target base steering quantity can be used by itself to assist the driver in steering the vehicle to a certain extent.

The assistive force control means may calculate a target base current depending on the target base steering assistive quantity and a corrective current depending on the corrective quantity, add the corrective current to the target base current thereby to calculate a target current depending on the target steering assistive quantity, and control the assistive force generating means based on the target current. Since the correction process is performed using current values, the correction process can be incorporated into basic control processes with small control changes.

The assistive force control means may further include an amplifier for amplifying the target base steering assistive quantity with a predetermined coefficient, and the amplifier may use different values for the predetermined coefficient before and after the drive mode control unit performs any one of the first switching operation, the second switching operation, and the third switching operation. Therefore, the steering correction, which occurs upon switching between drive modes, can be changed only by changing the predetermined coefficient. The above advantages can thus be achieved by incorporating small changes into the basic control processes.

The assistive force control means may control the assistive force generating means using control maps, which represent control quantities for an operated state of the manual steering means, and use different ones of the maps before and after the drive mode control unit performs any one of the first switching operation, the second switching operation, and the third switching operation. Since upon switching between drive modes the steering correction is changed only by switching between the maps, the calculational load for the steering correction can be reduced.

If the front wheels comprise steerable wheels and the rear wheels comprise non-steerable wheels, then when the drive mode control unit performs the first switching operation, the assistive force control means may change the control process for controlling the steering assistive force in order to make the steering assistive force greater in the front-wheel-only-drive mode than in the rear-wheel-only-drive mode, when the drive mode control unit performs the second switching operation, the assistive force control means may change the control process for controlling the steering assistive force in order to make the steering assistive force greater in the composite drive mode than in the rear-wheel-only-drive mode, and when the drive mode control unit performs the third switching operation, the assistive force control means may change the control process for controlling the steering assistive force in order to make the steering assistive force greater in the front-wheel-only-drive mode than in the composite drive mode.

In modes in which the front wheels are driven as steerable wheels, i.e., in the front-wheel-only-drive mode or the composite drive mode, the self-aligning torque applied to the front wheels is greater and the steering resistance is greater than in the rear-wheel-only-drive mode, wherein only the rear wheels are driven as non-steerable wheels. With the above arrangement, since the steering assistive force is corrected so as to be greater in modes in which the front wheels are driven, the driver is prevented from feeling strange or uncomfortable about the way the vehicle is steered during transitioning between the drive modes, and an abrupt change is prevented from occurring in the output torque from the wheels.

If the drive mode control unit performs the first switching operation, then when the drive mode control unit changes from one of the front-wheel-only-drive mode and the rear-wheel-only-drive mode to the other mode, the drive mode control unit may interpose the composite drive mode therebetween. Therefore, when the front-wheel-only-drive mode changes to the rear-wheel-only-drive mode, or when the rear-wheel-only-drive mode changes to the front-wheel-only-drive mode, the output power (drive power) of the wheels is prevented from changing abruptly.

When the drive mode control unit changes from one of the front-wheel-only-drive mode and the rear-wheel-only-drive mode to the other mode, a drive force applied to one of the front wheels and the rear wheels, which are to stop being driven, may be progressively reduced, and a drive force applied to one of the front wheels and the rear wheels, which start being driven, may be progressively increased. Consequently, the wheels to which the progressively reduced drive force is applied and the wheels to which the progressively increased drive force is applied are gradually changed in behavior, whereby the output power (drive power) of the wheels can further be prevented from changing abruptly.

In the composite drive mode, while changing from one of the front-wheel-only-drive mode and the rear-wheel-only-drive mode to the other mode, a total of the drive force applied to one of the front wheels and the rear wheels, which are to stop being driven, and the drive force applied to one of the front wheels ($32a$, $32b$) and the rear wheels ($36a$, $36b$), which start being driven, may be kept constant. Consequently, it is possible to switch between the front-wheel-only-drive mode and the rear-wheel-only-drive mode without causing a change in the behavior of the vehicle, and hence without making the driver feel strange or uncomfortable due to a change in the behavior of the vehicle, which would otherwise be caused by switching between the modes.

According to the present invention, there is also provided a steering apparatus for use in a vehicle including a front wheel drive device for driving front wheels, a rear wheel drive device for driving rear wheels independently of the front wheel drive device, and a drive mode control unit for controlling the front wheel drive device and the rear wheel drive device to control drive modes of the front wheels and the rear wheels, wherein the drive mode control unit performs at least one of a first switching operation of switching between a front-wheel-only-drive mode in which only the front wheels are driven and a rear-wheel-only-drive mode in which only the rear wheels are driven, a second switching operation of switching between a composite drive mode in which both the front wheels and the rear wheels are driven and the rear-wheel-only-drive mode, and a third switching operation of switching between the composite drive mode and the front-wheel-only-drive mode. The steering apparatus further includes manual steering means that manually steers steerable wheels, which are at least the front wheels or the rear wheels, assistive force generating means, which generates a steering assistive force acting in the same direction as or in an opposite direction to a steering force applied to the manual steering means, for assisting in steering the steerable wheels with the manual steering means, and assistive force control means that controls the steering assistive force. Further, when the drive mode control unit performs any one of the first switching operation, the second switching operation, and the third switching operation, the assistive force control means changes a control process thereof for controlling the steering assistive force.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a functional block diagram of a drive electronic control unit (hereinafter referred to as a "drive ECU") and the EPS ECU for calculating a q-axis current target value;

DESCRIPTION OF THE PREFERRED EMBODIMENTS

I. Embodiment

A. Arrangement

Figure 1:
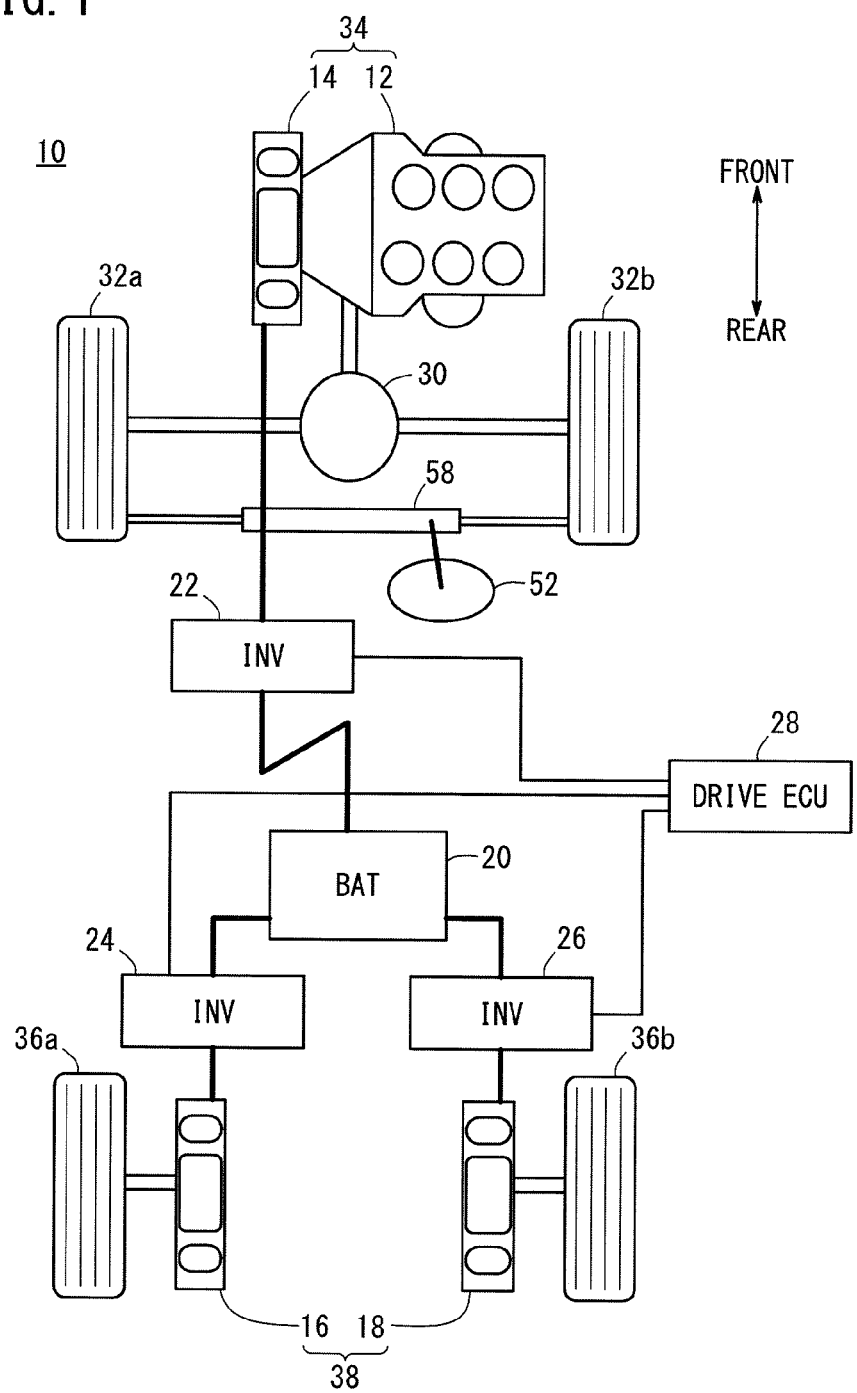
FIG. 1 is a schematic view of a drive system and nearby components of a vehicle according to an embodiment of the present invention.

A-1. Drive System of Vehicle 10:

FIG. 1 is a schematic view of the drive system and nearby components of a vehicle 10 according to an embodiment of the present invention. As shown in FIG. 1, the vehicle 10 includes an engine 12 and a first traction motor 14 (hereinafter referred to as a "first motor 14" or a "front motor 14") disposed in series in a front portion of the vehicle 10, second and third traction motors 16, 18 (hereinafter referred to as "second and third motors 16, 18" or "rear motors 16, 18") disposed in a rear portion of the vehicle 10, a high-voltage battery 20 (hereinafter referred to as a "battery 20"), first through third inverters 22, 24, 26, and a drive electronic control unit 28 (hereinafter referred to as a "drive ECU 28").

The engine 12 and the first motor 14 transmit a drive force (hereinafter referred to as a "front wheel drive force Ff") through a transmission 30 to a front left wheel 32a and a front right wheel 32b (hereinafter collectively referred to as "front wheels 32"). The engine 12 and the first motor 14 jointly make up a front wheel drive device 34 (steerable wheel drive device). When the vehicle 10 is under a low load, for example, the vehicle 10 is driven only by the first motor 14. When the vehicle 10 is under a medium load, the vehicle 10 is driven only by the engine 12. When the vehicle 10 is under a high load, the vehicle 10 is driven by both the engine 12 and the first motor 14.

The second motor 16, which has an output shaft thereof connected to the axle of a rear left wheel 36a, transmits a drive force to the rear left wheel 36a. The third motor 18, which has an output shaft thereof connected to the axle of a rear right wheel 36b, transmits a drive force to the rear right wheel 36b. The second and third motors 16, 18 jointly make up a rear wheel drive device 38 (non-steerable wheel drive device). The rear left wheel 36a and the rear right wheel 36b will hereinafter be referred to collectively as "rear wheels 36"). The drive force, which is transmitted from the rear wheel drive device 38 to the rear wheels 36, will hereinafter be referred to as a "rear wheel drive force Fr".

The high-voltage battery 20 supplies electric power through the first through third inverters 22, 24, 26 to the first through third motors 14, 16, 18, respectively, and is charged with regenerated electric power Preg from the first through third motors 14, 16, 18.

The drive ECU 28, which serves as a drive mode control unit, controls the engine 12 and the first through third inverters 22, 24, 26 based on output signals from various sensors and electronic control units (hereinafter referred to as "ECUs"), for thereby controlling output power of the engine 12 and the first through third motors 14, 16, 18. The drive ECU 28 has an input/output section, a processing section, and a storage section, all not shown. The drive ECU 28 may be a combination of ECUs. The drive ECU 28 may alternatively comprise a plurality of ECUs associated respectively with the engine 12 and the first through third motors 14, 16, 18, together with an ECU for managing driven states of the engine 12 and the first through third motors 14, 16, 18.

The engine 12 comprises a six-cylinder engine, for example, although the engine 12 may be any of various other engines, including a two-cylinder engine, a four-cylinder engine, an eight-cylinder engine, etc. The engine 12 may be a gasoline engine, a diesel engine, a compressed air engine, or the like.

Each of the first through third motors 14, 16, 18 comprises a three-phase AC brushless motor, for example, although the first through third motors 14, 16, 18 may be any of various other motors, including a three-phase AC brush motor, a single-phase AC motor, a DC motor, etc. The first through third motors 14, 16, 18 may have the same or different specifications. The rear left wheel 36a and the rear right wheel 36b may also be driven by a single traction motor.

The first through third inverters 22, 24, 26, each of which has a three-phase bridge configuration, convert a direct current into three-phase alternating currents, and supply the three-phase alternating currents to the first through third motors 14, 16, 18. The first through third inverters 22, 24, 26 also supply the high-voltage battery 20 with a direct current, which is converted from three-phase alternating currents supplied from the first through third motors 14, 16, 18 when the first through third motors 14, 16, 18 operate in a regenerative mode.

The high-voltage battery 20, which serves as an energy storage device having a plurality of battery cells, comprises a lithium ion secondary battery, a nickel hydrogen secondary battery, a capacitor, or the like, for example. According to the present embodiment, the high-voltage battery 20 comprises a lithium ion secondary battery. Respective DC/DC converters, not shown, may be connected between the first through third inverters 22, 24, 26 and the high-voltage battery 20, for thereby increasing or reducing the output voltage from the high-voltage battery 20, or the output voltages from the first through third motors 14, 16,

A-2. Steering System of Vehicle 10:
(2-1. Overall Configuration of Electric Power Steering Apparatus 50)

Figure 2:
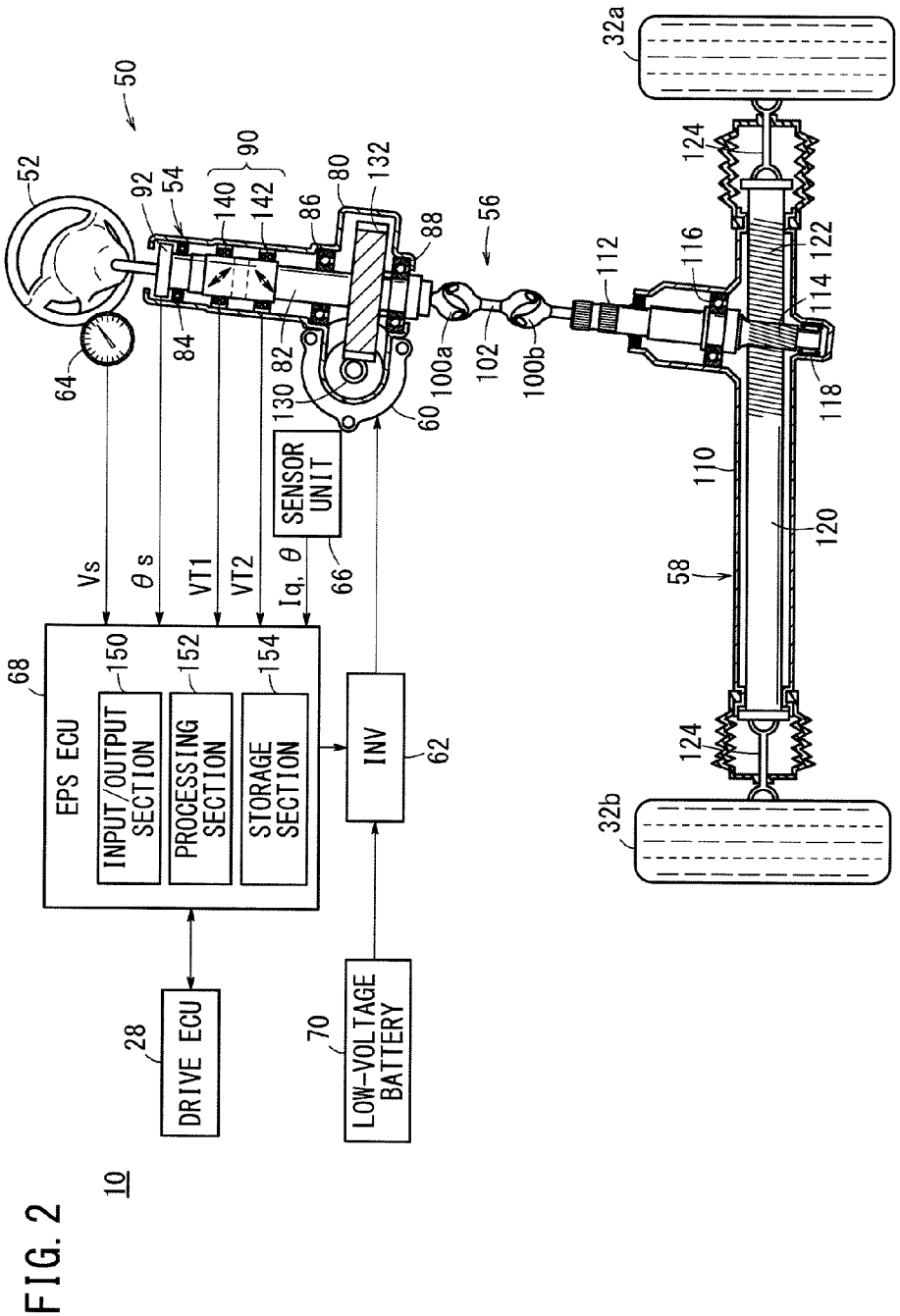
FIG. 2 is a schematic view, partially in cross section and block form, of an electric power steering apparatus, which serves as a steering system (steering apparatus) of the vehicle shown in FIG. 1.

FIG. 2 is a schematic view, partially in cross section and block form, of an electric power steering apparatus 50 (hereinafter referred to as an "EPS apparatus 50"), which serves as a steering system (steering apparatus) for the vehicle 10. As shown in FIG. 2, the EPS apparatus 50 includes a steering handle 52 (steering wheel) as a manual steering means, a steering column 54, an intermediate joint 56, a steering gearbox 58, a motor 60 for actuating the EPS apparatus 50 (hereinafter referred to as an "EPS motor 60"), an inverter 62 (hereinafter referred to as an "EPS inverter 62"), a vehicle speed sensor 64 that serves as a vehicle speed acquiring means, a sensor unit 66, an electric power steering electronic control unit 68 (hereinafter referred to as an "EPS ECU 68" or "ECU 68"), and a low-voltage battery 70 (hereinafter referred to as a "battery 70").

The steering column 54 has a housing 80, a steering shaft 82 rotatably supported in the housing 80 through a plurality of bearings 84, 86, 88, a torque sensor 90, and a steering angle sensor 92. The torque sensor 90 and the steering angle sensor 92 function as a manual steering state acquiring means.

The intermediate joint 56 includes two universal joints 100a, 100b, and a shaft 102 disposed between the two universal joints 100a, 100b.

The steering gearbox 58 includes a housing 110, a pinion shaft 112 including a pinion 114 of a rack and pinion mechanism and which is rotatably supported in the housing 110 by a pair of bearings 116, 118, a rack 120 including rack teeth 122 of the rack and pinion mechanism, and a pair of tie rods 124 connected to the respective front wheels 32.

(2-2. Manual Steering System)

The steering shaft 82 has one end thereof fixed to the steering handle 52 and the other end thereof connected to the universal joint 100a. The universal joint 100a interconnects the other end of the steering shaft 82 and an end of the shaft 102. The universal joint 100b interconnects the other end of the shaft 102 and an end of the pinion shaft 112. The pinion 114 of the pinion shaft 112 is held in mesh with the rack teeth 122 of the rack 120 for driving the same. Opposite ends of the rack 120 are connected to each of the front wheels 32 by the respective tie rods 124.

When the driver of the vehicle 10 turns the steering handle 52, a steering torque Tr (rotational force) is produced, which is transmitted through the steering shaft 82 and the intermediate joint 56 to the pinion shaft 112. The pinion 114 of the pinion shaft 112 and the rack teeth 122 of the rack 120 convert the steering torque Tr into a thrust force, which acts to displace the rack 120 longitudinally, i.e., in a transverse direction of the vehicle 10. When the rack 120 is displaced, the tie rods 124 angularly move the front wheels 32, thereby changing the direction of travel of the vehicle 10.

The steering shaft 82, the intermediate joint 56, the pinion shaft 112, the rack 120, and the tie rods 124 jointly make up a manual steering system for directly transmitting a steering action, which the driver has performed via the steering handle 52, to the front wheels 32.

(2-3. Steering Assistive System)
(2-3-1. Assistive Drive System)

The EPS motor 60, which serves as an assistive force generating means, is operatively coupled to the steering shaft 82 by a worm gear 130 and a worm wheel gear 132. More specifically, the EPS motor 60 has an output shaft thereof connected to the worm gear 130. The worm wheel gear 132, which is held in mesh with the worm gear 130, is integrally or elastically and displaceably combined with the steering shaft 82.

The EPS motor 60, which comprises a three-phase AC brushless motor, for example, is supplied with electric power from the low-voltage battery 70 through the EPS inverter 62, which is controlled by the EPS ECU 68, thereby generating a drive force (hereinafter referred to as a "steering assistive force Fasi") depending on the supplied electric power. The generated drive force, which assists the driver in steering the front wheels 32, is transmitted through the output shaft of the EPS motor 60, the worm gear 130, the steering shaft 82 (worm wheel gear 132), the intermediate joint 56, and the pinion shaft 112 to the rack 120. The EPS motor 60, the worm gear 130, and the steering shaft 82 (worm wheel gear 132) jointly make up an assistive drive system for generating a force (steering assistive force Fasi) to assist the driver in steering the front wheels 32.

(2-3-2. Assistive Control System)

The torque sensor 90, the vehicle speed sensor 64, the EPS inverter 62, the sensor unit 66, and the EPS ECU 68 jointly make up an assistive control system for controlling the assistive drive system. The assistive drive system, the assistive control system, and the low-voltage battery 70 will hereinafter also be referred to as a "steering assistive system".

According to the present embodiment, the output power of the EPS motor 60 is controlled by a so-called vector control process involving a d-axis and a q-axis. The vector control process is disclosed in Japanese Laid-Open Patent Publication No. 2006-256542 (hereinafter referred to as "JP2006-256542A"), Japanese Laid-Open Patent Publication No. 2009-090817 (hereinafter referred to as "JP2009-090817A"), Japanese Laid-Open Patent Publication No. 2010-064544 (hereinafter referred to as "JP2010-064544A"), or Japanese Laid-Open Patent Publication No. 2009-214711 (hereinafter referred to as "JP2009-214711A"), for example.

(a) Feed-Forward Control System Sensors:

The torque sensor 90, which comprises a magnetostrictive torque sensor that is highly resistant to flexure and torsion, includes a first detecting element (magnetostrictive film) 140 and a second detecting element (magnetostrictive film) 142, which are directly plated on the steering shaft 82. The first detecting element 140 generates a voltage (rightward torque voltage VT1) depending on a torque (rightward torque Tsr) that is generated in a clockwise direction as seen from the driver toward the steering handle 52, and outputs the generated voltage to the EPS ECU 68. The second detecting element 142 generates a voltage (leftward torque voltage VT2) depending on a torque (leftward torque Tsl) that is generated in a counterclockwise direction as seen from the driver toward the steering handle 52, and outputs the generated voltage to the EPS ECU 68.

The vehicle speed sensor 64 detects a vehicle speed Vs [Km/h], and outputs the detected vehicle speed Vs to the EPS ECU 68. The steering angle sensor 92 detects a steering angle θs [degrees], which is indicative of the angle that the steering handle 52 is turned by the driver, and outputs the detected steering angle θs to the EPS ECU 68.

The rightward torque voltage VT1, the leftward torque voltage VT2, the vehicle speed Vs, and the steering angle θs are used in a feed-forward control process, which is carried out by the EPS ECU 68.

(b) EPS Inverter 62:

The EPS inverter 62, which is of a three-phase bridge configuration, converts a direct current from the low-voltage battery 70 into three-phase alternating currents, and supplies the three-phase alternating currents to the EPS motor 60.

(c) Feedback Control System Sensors:

The sensor unit 66 detects a q-axis current Iq, which represents a torque current component in the vector control process referred to above. The sensor unit 66 includes respective current sensors (not shown) for detecting the currents of at least two of a U-phase, a V-phase, and a W-phase of the windings (not shown) of the EPS motor 60, a resolver (not shown) for detecting an electric angle θ representing the rotational angle of the output shaft or the outer rotor (not shown) of the EPS motor 60, and a processor for calculating a q-axis current Iq based on the currents of at least two phases and the electric angle θ. The EPS ECU 68 may perform the function of the aforementioned processor.

(d) EPS ECU 68:

As shown in FIG. 2, the EPS ECU 68, which serves as an assistive force control means, includes an input/output section 150, a processing section 152, and a storage section 154 as hardware components thereof. Based on output signals from various sensors, the EPS ECU 68 controls the output power of the EPS motor 60 through the EPS inverter 62, as will be described in detail later.

(2-3-3. Low-Voltage Battery 70)

The low-voltage battery 70 comprises a secondary battery such as a lead storage battery or the like, for example, which serves as an energy storage device for outputting a low voltage (12 V in the present embodiment).

B. Various Control Processes

Figure 3:
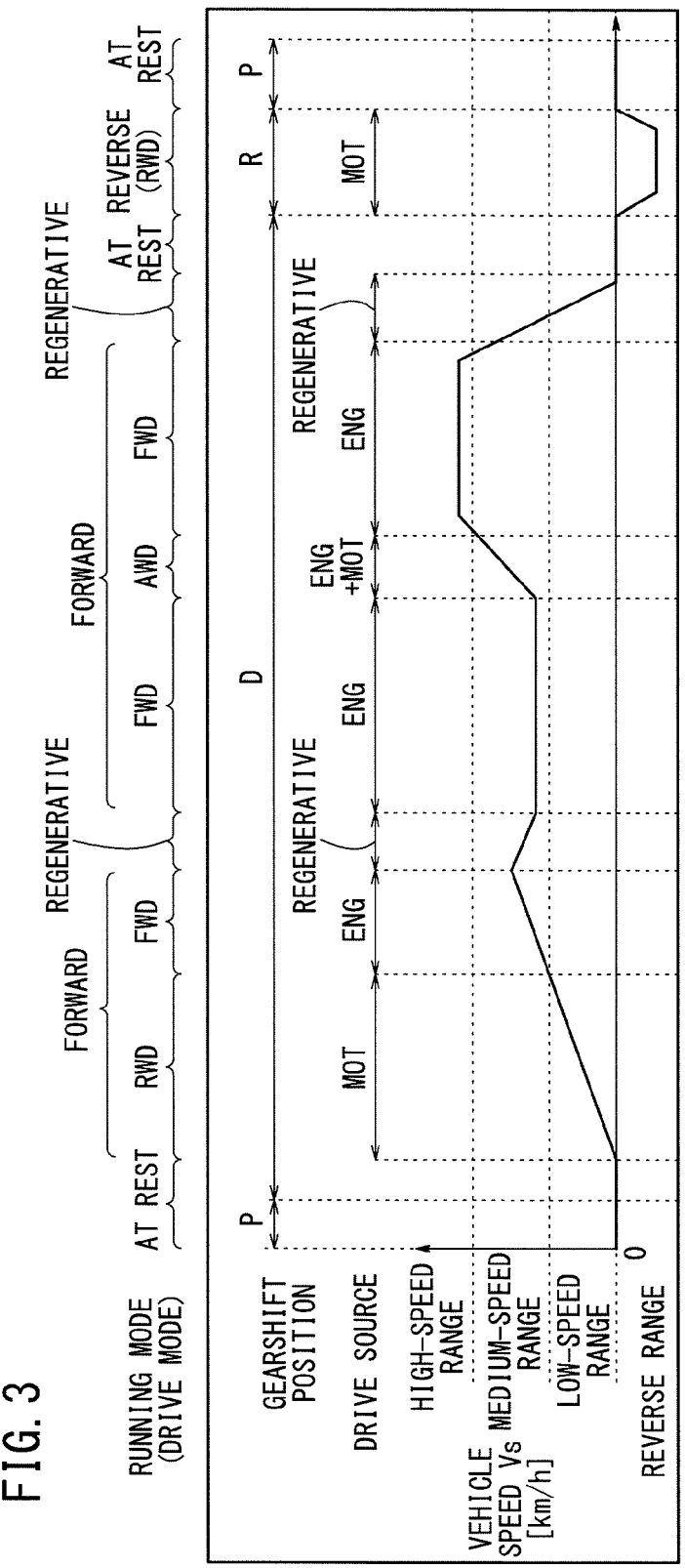
FIG. 3 is a diagram showing the manner in which the vehicle changes between different running modes (drive modes), and the manner in which a drive source thereof changes between different modes according to the embodiment.

B-1. Changing Between Drive Modes:
(1-1 General):

FIG. 3 is a diagram showing how the vehicle 10 changes between different running modes (drive modes), and how a drive source of the vehicle 10 changes between different modes according to the present embodiment. According to the present embodiment, the drive ECU 28 controls the vehicle 10 to change between the different running modes (drive modes), and also controls the drive source to change between the different modes.

In FIG. 3, "RUNNING MODE" implies that the vehicle 10 is either at rest, driven in a forward direction, driven in a regenerative mode, or is driven in a reverse direction, and "DRIVE MODE" implies that the vehicle 10 is in a "RWD" (Rear Wheel Drive) mode, an "FWD" (Front Wheel Drive) mode, or an "AWD" (All Wheel Drive) mode. RWD and FWD are a two-wheel-drive (2WD) mode, whereas AWD is a four-wheel-drive (4WD) mode. When the vehicle 10 is driven in a regenerative mode, as shown in FIG. 3, at least one of the first through third motors 14, 16, 18 operates in a regenerative mode.

In FIG. 3, "SHIFT POSITION" implies the position of a gearshift lever, in which "P" represents a parking range, "D" represents a forward range, and "R" represents a reverse range.

In FIG. 3, "DRIVE SOURCE" implies a device for driving the vehicle 10. "ENG" represents the engine 12. When the vehicle 10 is in the RWD mode, "MOT" represents the rear motors 16, 18. When the vehicle 10 is in the FWD mode, "MOT" represents the front motor 14. When the vehicle 10 is in the AWD mode, "MOT" represents the front and rear motors 14, 16, 18. When the vehicle 10 is in the AWD mode, "ENG+MOT" represents the engine 12 and the front and rear motors 14, 16, 18, and "REGENERATIVE" represents at least one of the front and rear motors 14, 16, 18.

As shown in FIG. 3, according to the present embodiment, the vehicle speed Vs is divided into a "LOW SPEED RANGE", a "MEDIUM SPEED RANGE", a "HIGH SPEED RANGE", and a "REVERSE SPEED RANGE". The drive source is switched depending on such speed ranges.

More specifically, when the vehicle 10 is driven in a forward or reverse direction with the vehicle speed Vs in the low speed range, the vehicle 10 is in the RWD mode. When the vehicle 10 is driven in a forward or reverse direction with the vehicle speed Vs in the medium speed range, the vehicle 10 is in the FWD or AWD mode. The FWD mode or the AWD mode is selected in the following manner. The opening movement of an accelerator pedal (hereinafter referred to as an "accelerator opening") coupled to the throttle valve of the engine 12 is compared with a threshold value (hereinafter referred to as an "accelerator opening threshold"). If the accelerator opening is smaller than the accelerator opening threshold, the FWD mode is selected, whereas if the accelerator opening is greater than the accelerator opening threshold, then the AWD mode is selected. When the vehicle 10 is driven in a forward direction with the vehicle speed Vs in the high speed range, the vehicle 10 is in the FWD mode.

Figure 13:
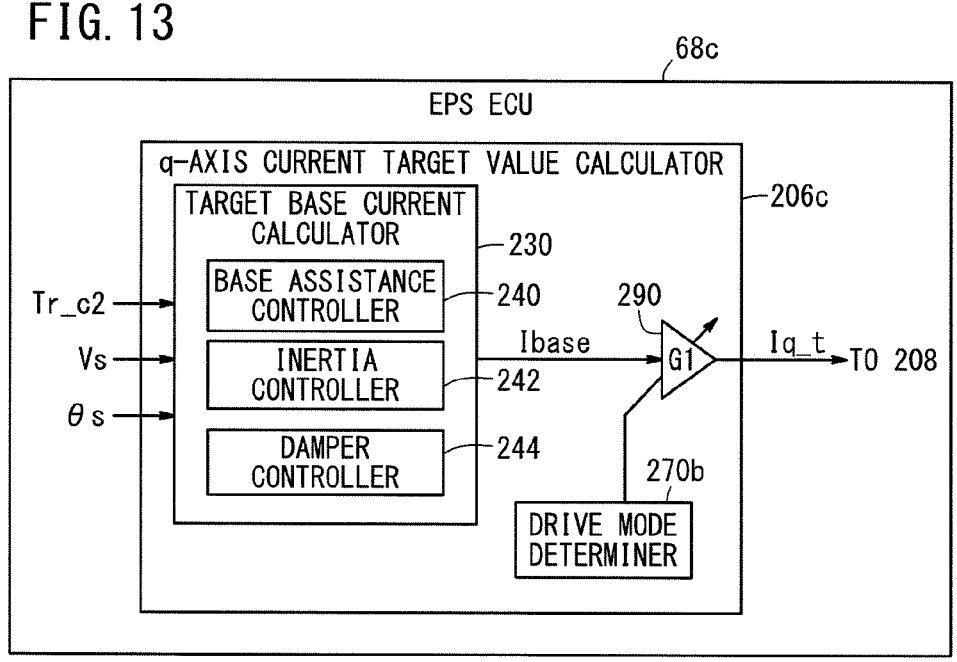
FIG. 13 is a block diagram of an arrangement (functional block) according to a third modification for calculating the q-axis current target value.

The running modes (drive modes) may be switched according to the method shown in FIG. 13 and the related description thereof as disclosed in US2012/0015772A.

(1-2. Process for Switching Between Running Modes (Drive Modes):

(1-2-1. Switching from RWD to FWD)

If the drive ECU 28 decides that the running mode (drive mode) is to be switched from RWD to FWD, then the drive ECU 28 temporarily uses AWD upon transitioning from RWD to FWD.

More specifically, the drive ECU 28 gradually reduces the drive force (rear wheel drive force Fr) for the rear wheels 36, which serve as non-steerable wheels, and gradually increases the drive force (front wheel drive force Ff) for the front wheels 32, which serve as steerable wheels. Therefore, the vehicle 10 is temporarily (e.g., during a period from 0.1 to 2.0 seconds) placed in the AWD mode, during which both RWD and FWD exist.

The AWD mode at this time (hereinafter referred to as a "transient AWD") is not used as the AWD mode (shown in FIG. 3), which is selected as a running mode (drive mode) by the drive ECU 28, but merely is used upon transitioning from RWD to FWD. Stated otherwise, while the AWD mode shown in FIG. 3 is selected based on at least one of the vehicle speed Vs, a temporal derivative thereof (hereinafter referred to as a "vehicle speed change"), the accelerator opening, a temporal derivative thereof (hereinafter referred to as an "opening change"), and a yaw rate, the transient AWD is used when it is decided to switch from RWD to FWD, based on at least one of the vehicle speed Vs, the vehicle speed change, the accelerator opening, the opening change, and the yaw rate.

When the vehicle 10 is in the transient AWD mode, the total of the front wheel drive force Ff and the rear wheel drive force Fr (hereinafter referred to as a "total drive force Ftotal") is kept constant. Consequently, it is possible to switch from RWD to FWD without causing a change in the behavior of the vehicle 10, and hence without making the driver feel strange or uncomfortable due to a change in the behavior of the vehicle 10, which would otherwise be caused by switching from RWD to FWD.

Alternatively, the vehicle 10 is in a transient AWD mode, in which the total drive force Ftotal may be changed depending on at least one of the accelerator opening, the opening change, and the vehicle speed change, for example. For example, when the accelerator opening is large, when the opening change is of a positive value, or when the vehicle speed change is of a positive value, the total drive force Ftotal may be increased. Further, when the accelerator opening is small, when the opening change is of a negative value, or when the vehicle speed change is of a negative value, the total drive force Ftotal may be reduced.

(1-2-2. Switching from FWD to RWD)

For switching from FWD to RWD, the same process that was used for switching from RWD to FWD may be carried out. In other words, a transient AWD is introduced upon switching from FWD to RWD. When the vehicle 10 is in the transient AWD mode, the total drive force Ftotal can be controlled.

(1-2-3. Switching from FWD or RWD to AWD)

For switching from FWD to AWD, the total drive force Ftotal is increased by increasing the rear wheel drive force Fr, while the front wheel drive force Ff is kept constant. Alternatively, the total drive force Ftotal may be kept constant or increased by increasing the rear wheel drive force Fr, while the front wheel drive force Ff is reduced. Further, alternatively, the total drive force Ftotal may be increased by increasing the rear wheel drive force Fr while also increasing the front wheel drive force Ff.

Similarly, for switching from RWD to AWD, the total drive force Ftotal is increased by increasing the front wheel drive force Ff, while the rear wheel drive force Fr is kept constant. Alternatively, the total drive force Ftotal may be kept constant or increased by increasing the front wheel drive force Ff, while the rear wheel drive force Fr is reduced. Further, alternatively, the total drive force Ftotal may be increased by increasing the front wheel drive force Ff while also increasing the rear wheel drive force Fr.

(1-2-4. Switching from AWD to FWD or RWD)

For switching from AWD to FWD, the total drive force Ftotal is reduced by reducing the rear wheel drive force Fr, while the front wheel drive force Ff is kept constant. Alternatively, the total drive force Ftotal may be kept constant or reduced by reducing the rear wheel drive force Fr, while the front wheel drive force Ff is increased. Further, alternatively, the total drive force Ftotal may be reduced by reducing the rear wheel drive force Fr while also reducing the front wheel drive force Ff.

Similarly, for switching from AWD to RWD, the total drive force Ftotal is reduced by reducing the front wheel drive force Ff, while the rear wheel drive force Fr is kept constant. Alternatively, the total drive force Ftotal may be kept constant or reduced by reducing the front wheel drive force Ff, while the rear wheel drive force Fr is increased. Further, alternatively, the total drive force Ftotal may be reduced by reducing the front wheel drive force Ff while also reducing the rear wheel drive force Fr.

Figure 4:
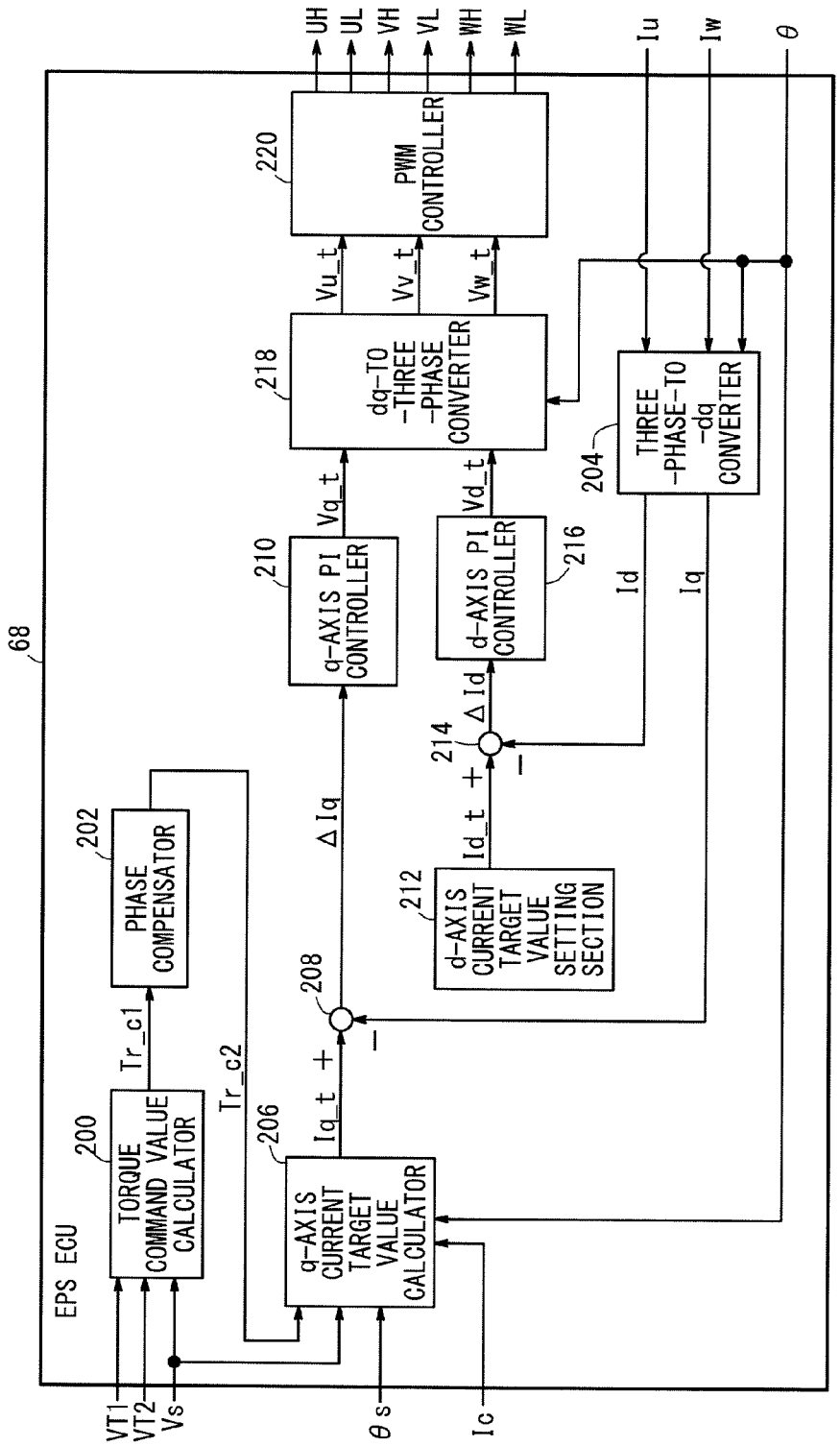
FIG. 4 is a functional block diagram of an EPS electronic control unit (hereinafter referred to as an "EPS ECU") for controlling a steering assistive force.

B-2. Controlling Steering Assistive Force Fasi (Controlling Output Power of EPS Motor 60):

(2-1 General):

FIG. 4 is a functional block diagram of the EPS ECU 68, which controls the steering assistive force Fasi. As shown in FIG. 4, the EPS ECU 68 has a torque command value calculator 200, a phase compensator 202, a three-phase-to-dq converter 204, a q-axis current target value calculator 206, a first subtractor 208, a q-axis PI controller 210, a d-axis current target value setting section 212, a second subtractor 214, a d-axis PI controller 216, a dq-to-three-phase converter 218, and a PWM controller 220. The functional components of the EPS ECU 68 are used to control the EPS inverter 62.

Basically, the EPS inverter 62 may be controlled by the control system disclosed in JP2006-256542A, JP2009-090817A, JP2010-064544A, or JP2009-214711A, and components thereof that are omitted from illustration in the present embodiment also are applicable thereto.

The torque command value calculator 200 determines a torque applied to the steering shaft 82, i.e., a detected torque Ts, based on the rightward torque voltage VT1 from the first detecting element 140, and the leftward torque voltage VT2 from the second detecting element 142.

Figure 5:
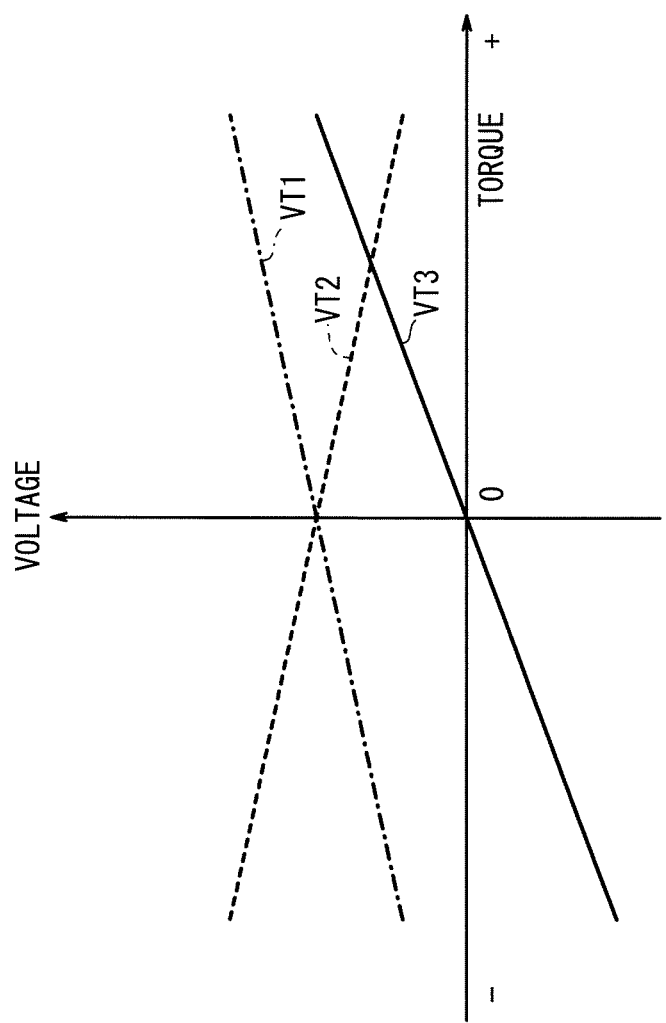
FIG. 5 is a diagram showing a graph of a relationship between the torque detected by a torque sensor, a rightward torque voltage, a leftward torque voltage, and a total torque voltage.

More specifically, the torque command value calculator 200 calculates a total torque voltage VT3 representing the difference between the rightward torque voltage VT1 and the leftward torque voltage VT2. Then, the torque command value calculator 200 determines a detected torque Ts based on the total torque voltage VT3 (see FIG. 5). Since a detected torque Ts can be calculated once the rightward torque voltage VT1 and the leftward torque voltage VT2 are known, a map, which represents the relationship between the rightward torque voltages VT1, the leftward torque voltages VT2, and the detected voltages Ts may be stored in the storage section 154, whereby the detected torque Ts can be determined using the map.

Then, the torque command value calculator 200 calculates a first torque command value Tr_c1 based on the detected torque Ts and the vehicle speed Vs from the vehicle speed sensor 64. The phase compensator 202 performs a phase compensating process on the first torque command value Tr_c1 in order to calculate a second torque command value Tr_c2.

The three-phase-to-dq converter 204 performs a three-phase-to-dq conversion process based on a U-phase current Iu, a W-phase current Iw, and an electric angle θ from the sensor unit 66 (resolver), in order to calculate a d-axis current Id as a current component in a d-axis direction (field current component), and a q-axis current Iq as a current component in a q-axis direction (torque current component). The three-phase-to-dq converter 204 outputs the q-axis current Iq to the first subtractor 208, and outputs the d-axis current Id to the second subtractor 214.

The three-phase-to-dq conversion process is a process for converting a set of a U-phase current Iu, a W-phase current Iw, and a V-phase current Iw (=−Iu−Iw), which are to be found, into a set made up of the d-axis current and the q-axis current Iq, according to a conversion matrix depending on the electric angle θ.

The q-axis current target value calculator 206 calculates a q-axis current target value Iq_t (target steering assistive quantity, target current), which is a target value for the q-axis current Iq, based on the second torque command value Tr_c2 from the phase compensator 202, the vehicle speed Vs from the vehicle speed sensor 64, the steering angle θs from the steering angle sensor 92, the electric angle θ from the sensor unit 66, and a corrective current Ic (corrective quantity) from the drive ECU 28. The q-axis current target value Iq_t implies a feed-forward command value for the d-axis current and the q-axis current, for causing the output shaft of the EPS motor 60 to generate a torque having the second torque command value Tr_c2.

The first subtractor 208 calculates the difference (=Iq_Iq) (hereinafter referred to as a "q-axis current difference ΔIq") between the q-axis current target value Iq_t and the q-axis current Iq, and outputs the calculated difference to the q-axis PI controller 210. The q-axis PI controller 210 calculates a q-axis voltage target value Vq_t as a target value for a q-axis voltage according to a PI control process (proportional plus integral control process) as a feedback control process in order to make the q-axis current difference ΔIq approach nil, and outputs the q-axis voltage target value Vq_t to the dq-to-three-phase converter 218.

The dq-to-three-phase converter 218 performs a dq-to-three-phase converting process based on the q-axis voltage target value Vq_t from the q-axis PI controller 210, the d-axis voltage target value Vd_t from the d-axis PI controller 216, and the electric angle θ from the sensor unit 66 (resolver), in order to calculate phase voltage target values Vu_t, Vv_t, Vw_t for the U-phase, the V-phase, and the W-phase. The dq-to-three-phase converter 218 outputs the phase voltage target values Vu_t, Vv_t, Vw_t to the PWM controller 220. The dq-to-three-phase conversion process is a process for converting a set of the d-axis voltage target value Vd_t and q-axis voltage target value Vq_t into a set made up of the phase voltage target values Vu_t, Vv_t, Vw_t, according to a conversion matrix depending on the electric angle θ.

The PWM controller 220 performs a pulse-width modulation (PWM) control process depending on the phase voltage target values Vu_t, Vv_t, Vw_t, and controls the EPS inverter 62 to energize the phase windings of the EPS motor 60. More specifically, the PWM controller 220 selectively turns on and off the upper switching elements (hereinafter referred to as "upper SW elements") and the lower switching elements (hereinafter referred to as "lower SW elements") of the EPS inverter 62 in order to energize the phase windings of the EPS motor 60.

More specifically, the PWM controller 220 generates drive signals UH, UL, VH, VL, WH, WL for the respective phase arms of the EPS inverter 62 within each switching period. If the duty ratio DUT in one entire switching period is 100%, then the duty ratio DUT2 of the lower SW elements is calculated by subtracting the duty ratio DUT1 of the upper SW element from 100%. Further, the duty ratios DUT1, DUT2 of the upper and lower SW elements with a dead time dt reflected therein represent the drive signals UH, UL, VH, VL, WH, WL, which actually are output.

(2-2 Calculation of q-axis Current Target Value Iq_t):

The q-axis current target value calculator 206 calculates the q-axis current target value Iq_t according to a combination of a base assistance control process, an inertia control process, and a damper control process, etc.

FIG. 6 is a functional block diagram of the drive ECU 28 and the EPS ECU 68 for calculating the q-axis current target value Iq_t.

(2-2-1. Processing in EPS ECU 68)

As shown in FIG. 6, the q-axis current target value calculator 206 of the EPS ECU 68 includes a target base current calculator 230, an adder 232, a fault determiner 234, and an on-off switch 236.

The target base current calculator 230 calculates a target base current Ibase (target base steering assistive quantity) using the second torque command value Tr_c2, the vehicle speed Vs, and the steering angle θs (see FIG. 4). As shown in FIG. 6, the target base current calculator 230 includes a base assistance controller 240 for carrying out a base assistance control process, an inertia controller 242 for carrying out an inertia control process, and a damper controller 244 for carrying out a damper control process.

According to the base assistance control process, the base assistance controller 240 calculates a base assistance current Iasi_base, which serves as a basis for the steering assistive force Fasi, based on the second torque command value Tr_c2 and the vehicle speed Vs. According to the inertia control process, which compensates for inertia in the steering system, the inertia controller 242 calculates an inertia corrective current line based on a temporal derivative of the second torque command value Tr_c2 and the vehicle speed Vs. According to the damper control process, which compensates for damping (viscosity) in the steering system, the damper controller 244 calculates a damping corrective current Idamp based on a temporal derivative of the steering angle θs (hereinafter referred to as a "steering angle change Δθs") and the vehicle speed Vs.

The target base current calculator 230 calculates the target base current Ibase by adding the base assistance current Iasi_base, the inertia corrective current line, and the damping corrective current Idamp.

The base assistance control process, the inertia control process, and the damper control process are disclosed in JP2006-256542A, JP2009-090817A, JP2010-064544A, or JP2009-214711A, for example. Stated otherwise, the target base current calculator 230 calculates the q-axis target value Iq_, which is calculated by the q-axis current target value calculator 206, according to techniques disclosed in the related art, as the target base current Ibase according to the present embodiment.

The adder 232 calculates the q-axis target value Iq_t (target current) by adding the target base current Ibase from the target base current calculator 230 and the corrective current Ic from the drive ECU 28.

When the process performed by the drive ECU 28, which controls the drive modes, suffers from a fault, the fault determiner 234 turns off the on-off switch 236 in order to cancel the corrective current Ic from the drive ECU 28, i.e., so that the corrective current Ic is not reflected in the q-axis target value Iq_t. The fault determiner 234 determines such a fault based on a notice from the drive ECU 28, or based on a function of the EPS ECU 68 to diagnose the drive ECU 28.

(2-2-2. Processing in Drive ECU 28)

(2-2-2-1. General)

Calculation of the corrective current Ic by the drive ECU 28 will be described below. As shown in FIG. 6, the drive ECU 28 includes a corrective current calculator 250 for calculating the corrective current Ic.

The corrective current calculator 250 includes a steering angle change calculator 252, an FWD control map 254, an AWD control map 256, an RWD control map 258, a drive mode controller 260, and a map switcher 262. The FWD control map 254, the AWD control map 256, and the RWD control map 258 will hereinafter be referred to as control maps 254, 256, 258, or simply maps 254, 256, 258.

(2-2-2-2. Processing in Steering Angle Change Calculator 252)

The steering angle change calculator 252 calculates a temporal derivative of the steering angle $\theta s$ (steering angle change $\Delta\theta s$) based on the steering angle $\theta s$ from the steering angle sensor 92. As described later, a temporal derivative of the electric angle $\theta$ (hereinafter referred to as an "electric angular velocity $\omega$") may be used instead of the steering angle change $\Delta\theta s$.

(2-2-2-3. Processing in Control Maps 254, 256, 258)

The control maps 254, 256, 258 store in advance a relationship between the steering angle change $\Delta\theta s$, the vehicle speed Vs, and provisional corrective currents Ic_fwd, Ic_awd, Ic_fwd, which serve as a basis for the corrective current Ic for the respective drive modes FWD, AWD, RWD. The control maps 254, 256, 258 output the provisional corrective currents Ic_fwd, Ic_awd, Ic_rwd depending on the steering angle change $\Delta\theta s$ and the vehicle speed Vs. Stated otherwise, the control maps 254, 256, 258 define characteristic curves for correcting damping characteristics that are used in the damper controller 244.

For example, the FWD control map 254 defines a $\Delta\theta s$ vs. Ic_fwd characteristic curve, as shown in FIG. 6, which represents the relationship between the steering angle change $\Delta\theta s$ and the provisional corrective current Ic_fwd at a time that the vehicle speed Vs is nil. As the vehicle speed Vs becomes higher, the provisional corrective current Ic_fwd (corrective current Ic, i.e., the torque of the EPS motor 60) becomes greater. Consequently, when the vehicle speed Vs becomes higher, it is possible to adjust the steering angle $\theta s$ of the steering handle 52 in smaller degrees. Similarly, according to the AWD control map 256 and the RWD control map 258, as the vehicle speed Vs becomes higher, the provisional corrective currents Ic_awd, Ic_rwd (corrective current Ic, i.e., the torque of the EPS motor 60) become greater.

According to the present embodiment, as shown in FIG. 6, if the vehicle speed Vs and the steering angle change $\Delta\theta s$ remain the same, then the provisional corrective current Ic_awd of the AWD control map 256 is greater than the provisional corrective current Ic_rwd of the RWD control map 258. More specifically, if the vehicle speed Vs and the steering angle change $\Delta\theta s$ remain the same, then the provisional corrective current Ic_awd of the AWD control map 256 is represented by a multiple, by a number greater than 1, of the provisional corrective current Ic_rwd of the RWD control map 258. In addition, if the vehicle speed Vs and the steering angle change $\Delta\theta s$ remain the same, then the provisional corrective current Ic_fwd of the FWD control map 254 is greater than the provisional corrective current Ic_awd of the AWD control map 256. More specifically, if the vehicle speed Vs and the steering angle change $\Delta\theta s$ remain the same, then the provisional corrective current Ic_fwd of the FWD control map 254 is represented by a multiple, by a number greater than 1, of the provisional corrective current Ic_awd of the AWD control map 256.

According to the present embodiment, if the vehicle speed Vs and the steering angle change $\Delta\theta s$ remain the same, then the provisional corrective current Ic_awd of the AWD mode becomes greater than the provisional corrective current Ic_rwd of the RWD mode, and the provisional corrective current Ic_fwd of the FWD mode becomes greater than the provisional corrective current Ic_awd of the AWD mode for the following reasons.

When the vehicle 10 corners, the self-aligning torque applied to the front wheels 32, which serve as steerable wheels, becomes greater as the front wheel drive force Ff is greater. Therefore, if the total of the front wheel drive force Ff and the rear wheel drive force Fr, i.e., the total drive force Ftotal, remains the same, then the self-aligning torque applied to the front wheels 32 is greatest in the FWD mode and smallest in the RWD mode.

For the above reasons, when the drive modes FWD, RWD, AWD are switched, the self-aligning torque applied to the front wheels 32 changes, even if the total drive force Ftotal remains the same. In particular, when the drive modes FWD and RWD are switched, the self-aligning torque applied to the front wheels 32 changes significantly. The change in the self-aligning torque applied to the front wheels 32 is likely to make the driver feel strange or uncomfortable concerning the way in which the vehicle 10 is steered.

According to the present embodiment, if the vehicle speed Vs and the steering angle change $\Delta\theta s$ remain the same, then the provisional corrective current Ic_awd of the AWD mode is greater than the provisional corrective current Ic_rwd of the RWD mode, and the provisional corrective current Ic_fwd of the FWD mode is greater than the provisional corrective current Ic_awd of the AWD mode. Therefore, upon switching between the FWD mode and the RWD mode (first switching operation), upon switching between the AWD mode and the RWD mode (second switching operation), or upon switching between the AWD mode and the FWD mode (third switching operation), the corrective current Ic (the torque of the EPC motor 60) is changed in order to minimize any sudden changes in the self-aligning torque. Consequently, the vehicle 10 enables the driver to feel natural concerning the way in which the vehicle 10 is steered.

(2-2-2-4. Processing in Drive Mode Controller 260)

The drive mode controller 260 controls the drive modes FWD, RWD, AWD of the vehicle 10. For controlling the drive modes FWD, RWD, AWD, the drive mode controller 260 continuously calculates the front wheel drive force Ff and the rear wheel drive force Fr, and outputs the front wheel drive force Ff and the rear wheel drive force Fr to the map switcher 262. The drive mode controller 260 calculates the front wheel drive force Ff and the rear wheel drive force Fr on the basis of the rotational speed of the engine 12, the currents consumed by the traction motors 14, 16, 18, etc.

(2-2-2-5. Processing in Map Switcher 262)

The map switcher 262 determines one of the drive modes FWD, RWD, AWD of the vehicle 10, and outputs a corrective current Ic, which corresponds to the determined drive mode, to the adder 232 of the EPS ECU 68, based on an output current (one of the provisional corrective currents Ic_fwd, Ic_awd, Ic_rwd) from one of the maps 254, 256, 258.

Figure 7:
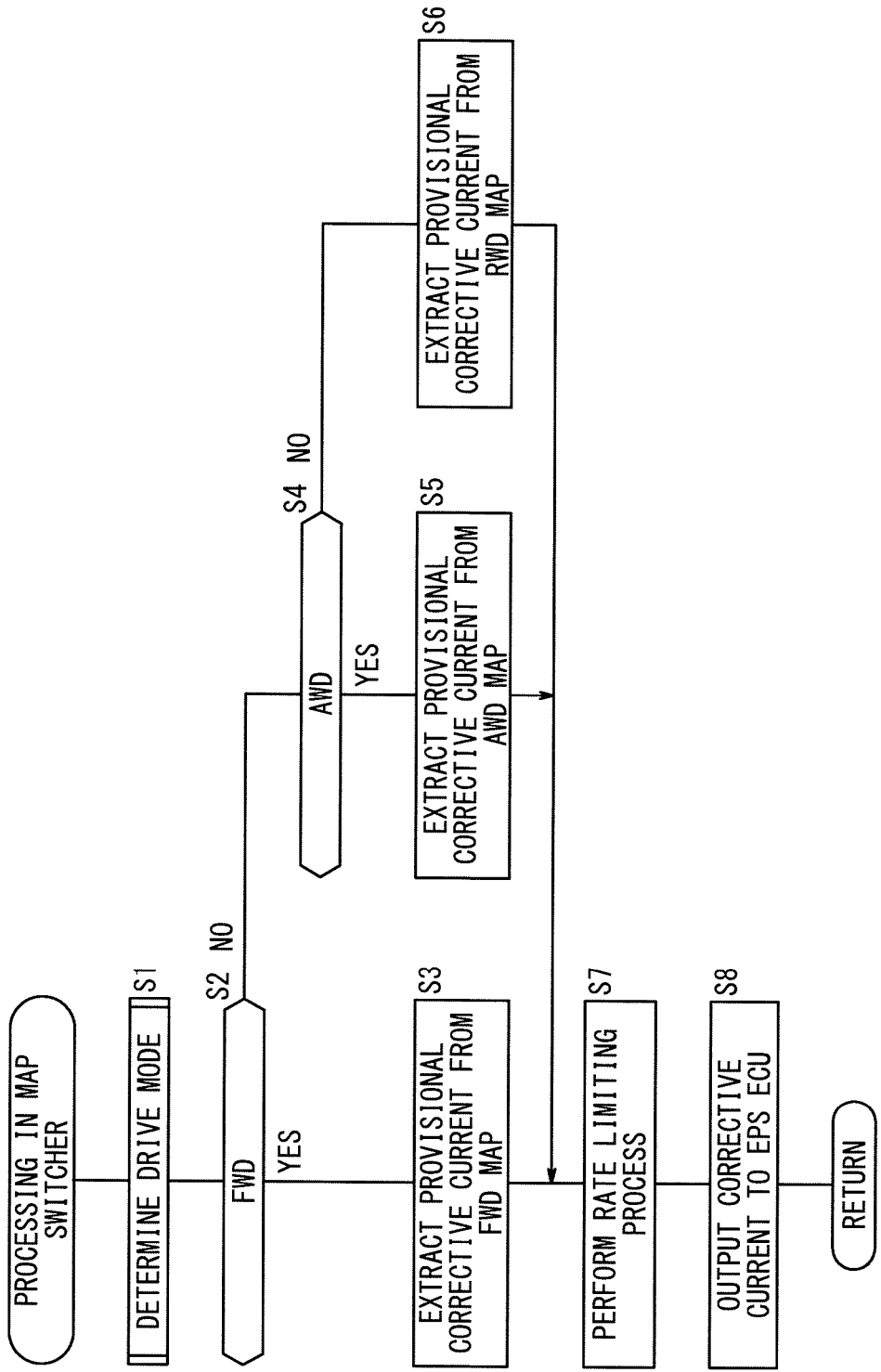
FIG. 7 is a flowchart of a processing sequence of a map switcher.

FIG. 7 is a flowchart of a processing sequence of the map switcher 262. In step S1 of FIG. 7, the map switcher 262 determines one of the drive modes FWD, RWD, AWD of the vehicle 10, as will be described in detail later with reference to FIG. 8.

In step S2, the map switcher 262 judges whether or not the drive mode determined in step S1 is the FWD mode. If the drive mode is the FWD mode (step S2: YES), then in step S3, the map switcher 262 extracts the provisional corrective current Ic_fwd from the FWD control map 254, after which control proceeds to step S7. If the drive mode is not the FWD mode (step S2: NO), then control proceeds to step S4.

In step S4, the map switcher 262 judges whether or not the drive mode determined in step S1 is the AWD mode. If the drive mode is the AWD mode (step S4: YES), then in step S5, the map switcher 262 extracts the provisional corrective current Ic_awd from the AWD control map 256, after which control proceeds to step S7. If the drive mode is not the AWD mode (step S4: NO), then in step S6, the map switcher 262 extracts the provisional corrective current Ic_rwd from the RWD control map 258, after which control proceeds to step S7.

In step S7, after any one of steps S3, S5, and S6, the map switcher 262 carries out a rate limiting process. The rate limiting process is a process for preventing the corrective current Ic from changing abruptly.

According to the rate limiting process, the map switcher 262 calculates the difference D between a corrective current Ic in the preceding processing cycle (hereinafter referred to as a "corrective current Ic (preceding)") and any one of the provisional corrective currents Ic_fwd, Ic_awd, and Ic_rwd extracted in the present processing cycle (hereinafter referred to as a "provisional corrective current Ic_temp (present)"). If the absolute value of the difference D is equal to or smaller than a positive threshold value (hereinafter referred to as a "corrective current threshold value THic"), then the map switcher 262 calculates the provisional corrective current Ic_temp (present) as a corrective current Ic in the present processing cycle (hereinafter referred to as a "corrective current Ic (present)") (corrective current Ic (present)←provisional corrective current Ic_temp (present)).

If the absolute value of the difference D is not equal to or smaller than the corrective current threshold value THic, and the difference D is of a positive value, then the map switcher 262 calculates the sum of the corrective current Ic (preceding) and the threshold value THic as the corrective current Ic (present) (corrective current Ic (present)←corrective current Ic (preceding)−threshold value THic).

In step S8, the map switcher 262 outputs the corrective current Ic (present), which was calculated in step S7, to the adder 232 of the EPS ECU 68.

Figure 8:
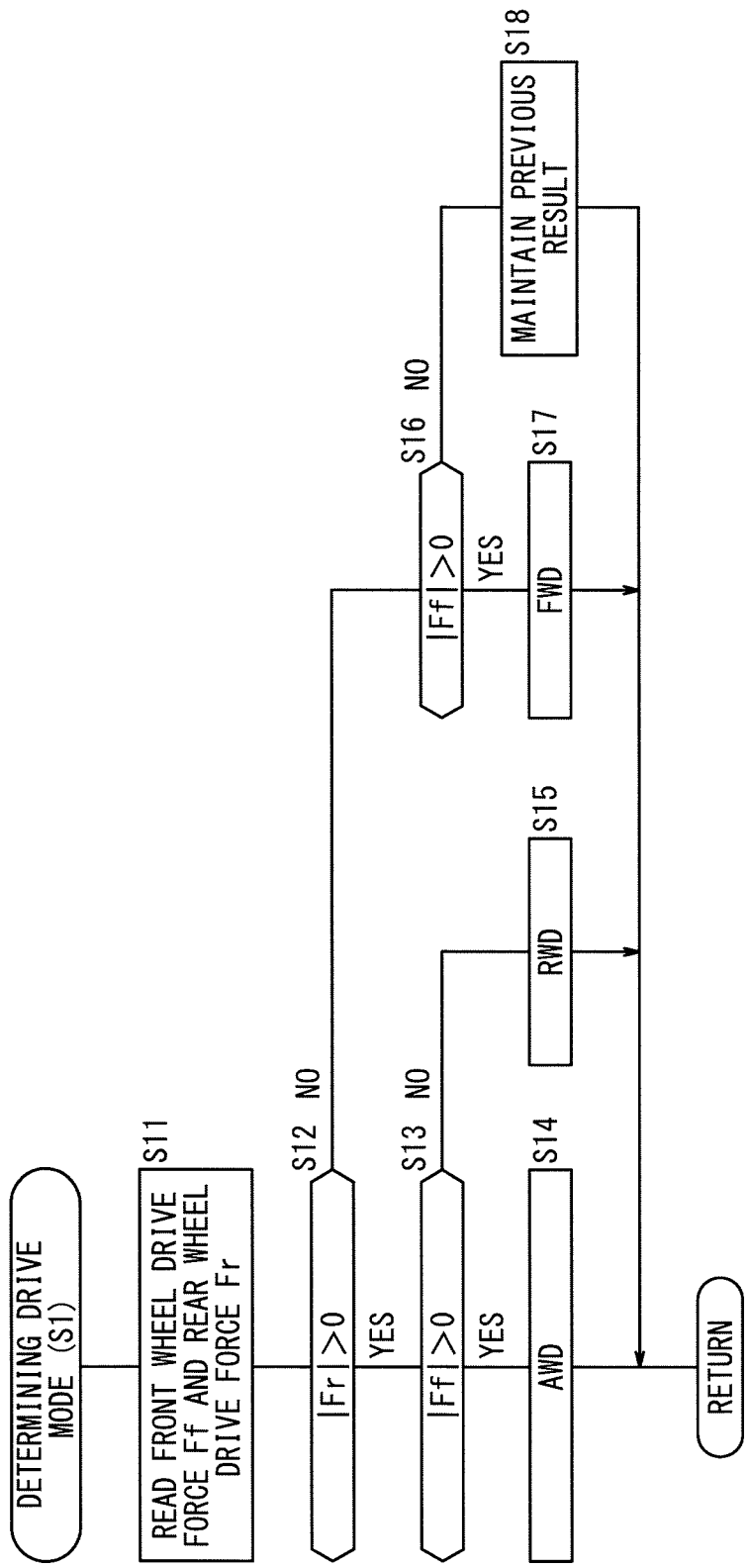
FIG. 8 is a flowchart of a processing sequence (details of step S1 of FIG. 7) of the map switcher for judging a drive mode of the vehicle.

FIG. 8 is a flowchart of an operation sequence (details of step S1 of FIG. 7) of the map switcher 262 for determining one of the drive modes of the vehicle 10. In step S11 of FIG. 8, the map switcher 262 reads the front wheel drive force Ff and the rear wheel drive force Fr from the drive mode controller 260.

In step S12, the map switcher 262 judges whether or not the absolute value of the rear wheel drive force Fr, which was read in step S11, is greater than 0, thereby determining whether or not the vehicle 10 is in the RWD mode (including the AWD mode). If the absolute value of the rear wheel drive force Fr is greater than 0 (step S12: YES), then in step S13, the map switcher 262 judges whether or not the absolute value of the front wheel drive force Ff, which was read in step S11, is greater than 0, thereby determining whether or not the vehicle 10 is in the FWD mode (including the AWD mode).

If the absolute value of the front wheel drive force Ff is greater than 0 (step S13: YES), then in step S14, the map switcher 262 decides that the vehicle 10 is presently in the AWD mode. If the absolute value of the front wheel drive force Ff is not greater than 0 (step S13: NO), then in step S15, the map switcher 262 decides that the vehicle 10 is presently in the RWD mode.

If the absolute value of the rear wheel drive force Fr read in step S11 is not greater than 0 (step S12: NO), then in step S16, the map switcher 262 judges whether or not the absolute value of the front wheel drive force Ff, which was read in step S11, is greater than 0, thereby determining whether or not the vehicle 10 is in the FWD mode.

If the absolute value of the front wheel drive force Ff is greater than 0 (step S16: YES), then in step S17, the map switcher 262 decides that the vehicle 10 is presently in the FWD mode. If the absolute value of the front wheel drive force Ff is not greater than 0 (step S16: NO), then in step S18, the map switcher 262 maintains the decision from the previous processing cycle.

As described above, the drive mode of the vehicle 10 is determined using detected values of the front wheel drive force Ff and the rear wheel drive force Fr. Accordingly, the corrective current IC can be calculated using the actual drive mode, rather than a command value.

Instead, the map switcher 262 may determined the drive mode of the vehicle 10 based on command values (e.g., target values for the front wheel drive force Ff and the rear wheel drive force Fr), which are used by the drive mode controller 260.

C. Advantages of the Present Embodiment

According to the present embodiment, as described above, for switching from one of the drive modes FWD, RWD, AWD to another mode, the control process for controlling the steering assistive force Fasi is varied in order to minimize a change in the self-aligning torque applied to the front wheels 32, for thereby allowing the driver to feel natural concerning the way in which the vehicle 10 is steered. Hence, the driver is capable of steering the vehicle 10 more appropriately.

According to the present embodiment, in addition, the front wheels 32 (steerable wheels) and the rear wheels 36 (non-steerable wheels) are driven independently of each other. Thus, it is possible to control the front wheel drive force Ff and the rear wheel drive force Fr more finely than if a single drive source (engine 12 or the like) were used to drive the vehicle in the 2WD mode (at least one of the FWD mode and the RWD mode) or in the 4WD mode (AWD mode). By controlling the steering assistive force Fasi finely and thereby making the driver feel natural concerning the way in which the vehicle 10 is steered, it is possible to enable the driver to steer the vehicle 10 appropriately.

According to the present embodiment, the q-axis current target value calculator 206 (assistive force control means) calculates the target base current Ibase (target base steering assistive quantity) and the corrective current Ic (corrective quantity), which is based on the drive mode, on the basis of the steering angle θs (steering state) and the detected torque Ts (steering state) of the steering handle 52 (manual steering means), and the vehicle speed Vs. When the drive mode changes to another drive mode, the q-axis current target value calculator 206 changes the corrective current Ic in order to calculate the q-axis current target value Iq_t (target steering assistive quantity, target current). Even if the corrective current Ic cannot be calculated, the target base current Ibase can be used by itself to assist the driver in steering the vehicle 10 to a certain extent. In addition, since the correction process is performed using current values, the correction process can be incorporated with small control changes to the base assistance control process, the inertia control process, and the damper control process, which serve as basic control processes.

According to the present embodiment, the q-axis current target value calculator 206 (assistive force control means) controls the EPS motor 60 using the control maps 254, 256, 258 (FIG. 6) of the corrective current calculator 250. Further, the different maps 254, 256, 258 are used before and after the drive ECU 28 switches between drive modes. Since upon switching between drive modes, the steering correction is changed only by switching between the maps 254, 256, 258, the calculational load required to perform the steering correction can be reduced.

The q-axis current target value calculator 206 (assistive force control means) varies the control process for controlling the steering assistive force Fasi (see FIG. 6), in order to make the steering assistive force Fasi greater in the FWD mode or the AWD mode than in the RWD mode, and also to make the steering assistive force Fasi greater in the FWD mode than in the AWD mode. In the FWD mode or the AWD mode, the self-aligning torque applied to the front wheels 32 is greater and the steering resistance is greater than in the RWD mode. With the above arrangement, the steering assistive force Fasi is corrected so as to be greater in the FWD mode or the AWD mode, for thereby preventing the driver from feeling strange or uncomfortable concerning the way in which the vehicle 10 is steered, and also for preventing abrupt changes from occurring in the output torque from the wheels during transitions between the drive modes.

According to the present embodiment, when one of the FWD mode and the RWD mode changes to the other mode, the AWD mode is implemented as a transient mode for thereby preventing the output power (drive power) of the wheels from changing abruptly due to a change from the FWD mode to the RWD mode, or due to a change from the RWD mode to the FWD mode.

According to the present embodiment, when one of the FWD mode and the RWD mode changes to the other mode, the drive force applied to those of the front wheels 32 (steerable wheels) and the rear wheels 36 (non-steerable wheels), which are to stop being driven, is progressively reduced, whereas the drive force applied to those of the front wheels 32 and the rear wheels 36, which start being driven, is progressively increased. Consequently, the wheels to which the progressively reduced drive force is applied and the wheels to which the progressively increased drive force is applied are gradually changed in behavior, so that the output power (drive power) of the wheels can be prevented from changing abruptly.

According to the present embodiment, the total drive force Ftotal, represented by the sum of the front wheel drive force Ff and the rear wheel drive force Fr, is kept constant in the transient AWD mode. Thus, the FWD mode can be switched to the RWD mode, or the RWD mode can be switched to the FWD mode without causing a change in the driving behavior of the vehicle 10, thereby preventing the driver from feeling strange or uncomfortable due to a change in driving behavior caused by such a mode change.

According to the present embodiment, the corrective current Ic is calculated by the drive ECU 28 and output to the EPS ECU 68. Therefore, the corrective current Ic can be calculated without the need for computational logic for calculating the corrective current Ic to be added to the EPS ECU 68. Even if, for certain reasons, it becomes difficult for the drive ECU 28 to calculate the corrective current Ic, it is still possible to perform the control process using only the target base current Ibase.

II. Modifications

The present invention is not limited to the above embodiment, but various alternative arrangements can be adopted based on the content of the present disclosure. For example, the present invention can adopt the following arrangements.

A. The Vehicle 10 (Object to which the Invention is Applicable)

In the above embodiment, the vehicle 10 (FIG. 1) has been described as a four-wheeled automotive vehicle. However, the present invention is applicable to vehicles in which at least two of the FWD mode, the RWD mode, and the AWD mode can be switched, e.g., any of a two-wheeled automotive vehicle, a three-wheeled automotive vehicle, and a six-wheeled automotive vehicle.

In the above embodiment, the vehicle 10 includes a single engine 12 and three traction motors 14, 16, 18 as drive sources. However, other combinations of drive sources may be employed. For example, the vehicle 10 may have one or more traction motors that serve as drive sources for the front wheels 32, and one or more traction motors that serve as drive sources for the rear wheels 36. Further, for example, the vehicle 10 may have only one traction motor for the front wheels 32 or the rear wheels 36, with a differential being used to distribute drive forces to the left and right wheels. It is also possible for the vehicle 10 to incorporate a system having respective individual traction motors (including so-called in-wheel motors) assigned to each of the wheels.

In the above embodiment, the front wheel drive device 34 (steerable wheel drive device) including the engine 12 and the first motor 14 drives the front wheels 32, whereas the rear wheel drive device 38 (non-steerable wheel drive device) including the second and third motors 16, 18 drives the rear wheels 36. However, the vehicle 10 may incorporate other wheel drive devices, insofar as such wheel drive devices include a steerable wheel drive device for driving steerable wheels and a non-steerable wheel drive device for driving non-steerable wheels. However, in any of such cases, the non-steerable wheel drive device preferably drives the non-steerable wheels independently of the steerable wheel drive device.

Figure 9:
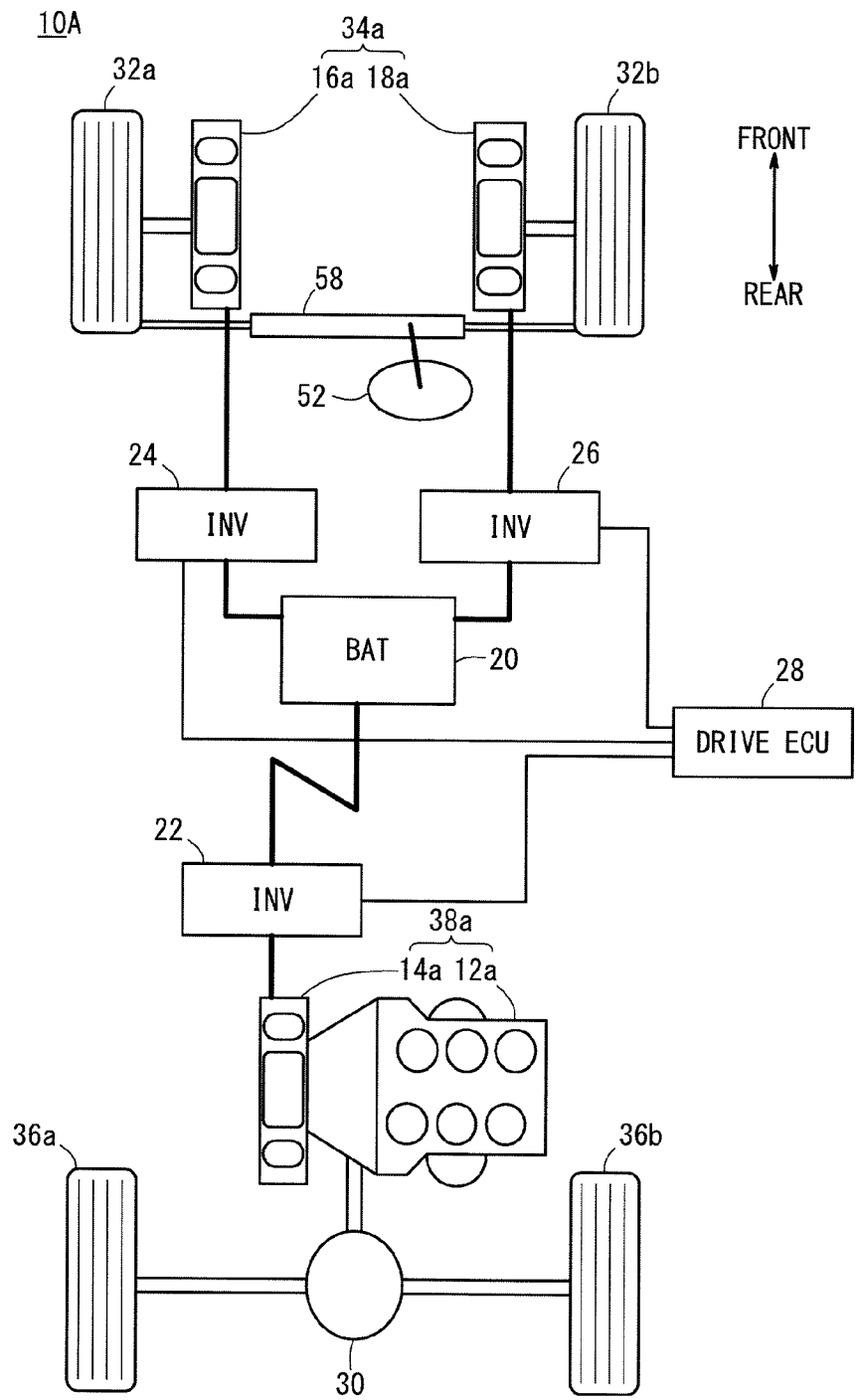
FIG. 9 is a schematic view of the drive system and nearby components of a vehicle according to a modification of the present invention.

FIG. 9 is a schematic view of the drive system and nearby components of a vehicle 10A according to a modification of the present invention. The vehicle 10A differs from the vehicle 10 according to the above embodiment, in that the structural details of the front wheel drive device 34 and the rear wheel drive device 38 are switched. More specifically, the vehicle 10A has a front wheel drive device 34a including second and third traction motors 16a, 18a disposed in a front portion of the vehicle 10A, and a rear wheel drive device 38a including an engine 12a and a first traction motor 14a disposed in series in a front portion of the vehicle 10A.

In the above embodiment and in the modification shown in FIG. 9, the front wheels 32 are steerable wheels and the rear wheels 36 are non-steerable wheels. However, both the front wheels 32 and the rear wheels 36 may be steerable wheels, or the rear wheels 36 may be steerable wheels whereas the front wheels 32 may be non-steerable wheels.

B. First Through Third Traction Motors 14, 16, 18 and EPS Motor 60

In the above embodiment, each of the first through third traction motors 14, 16, 18 and the EPS motor 60 is a three-phase AC brushless motor. However, each of the first through third traction motors 14, 16, 18 and the EPS motor 60 may be a three-phase AC brush motor, a single-phase AC motor, or a DC motor.

In the above embodiment, the first through third traction motors 14, 16, 18 and the EPS motor 60 are supplied with electric power from the high-voltage battery 20. However, the first through third traction motors 14, 16, 18 and the EPS motor 60 may also be supplied with electric power from a fuel cell.

C. Electric Power Steering Apparatus 50

The EPS apparatus 50 according to the above embodiment comprises a structure in which the EPS motor 60 transmits the steering assistive force Fasi to the steering shaft 82 (a so-called column-assisted EPS apparatus). However, the EPS apparatus 50 is not limited to such a structure, insofar as the EPS apparatus 50 is capable of generating the steering assistive force Fasi. For example, the EPS apparatus 50 may be any one of a pinion-assisted EPS apparatus, a dual-pinion-assisted EPS apparatus, a rack-assisted EPS apparatus, and an electro-hydraulic power steering apparatus. In an electro-hydraulic power steering apparatus, an electrically operated pump generates a hydraulic pressure for producing a steering assistive force Fasi. Such an electro-hydraulic power steering apparatus can be incorporated in a large-size vehicle, which includes the low-voltage battery 70 (e.g., a 12V battery) mounted therein.

In the above embodiment, the steering torque applied by the driver is directly transmitted to the front wheels 32 (hereinafter referred to as a "direct transmission type"). However, the present invention also may be applied to a steer-by-wire type of electric power steering apparatus (see, for example, Japanese Laid-Open Patent Publication No. 2006-224804).

D. Controlling Drive Modes of Vehicle 10

In the above embodiments, the drive modes FWD, RWD, AWD of the vehicle 10 can be switched. However, the present invention also may be applied to a vehicle that is capable of switching between two of the above drive modes. For example, the present invention is applicable to a vehicle that is capable of switching between the FWD mode and the RWD mode only (first switching operation), switching between the AWD mode and the RWD mode only (second switching operation), or switching between the AWD mode and the FWD mode only (third switching operation).

E. Controlling Steering Assistive Force Fasi

E-1. Determination of Drive Modes

In the above embodiment, drive modes of the vehicle 10 are determined according to the flowchart of FIG. 8. However, the drive modes of the vehicle 10 may be determined according to other operation sequences. In the flowchart of FIG. 8, the front wheel drive force Ff and the rear wheel drive force Fr, which serve as detected values, are used to determine the drive modes of the vehicle 10. However, the drive modes of the vehicle 10 may be determined using command values (e.g., target values for the front wheel drive force Ff and the rear wheel drive force Fr), which are used by the drive mode controller 260 of the drive ECU 28.

Figure 10:
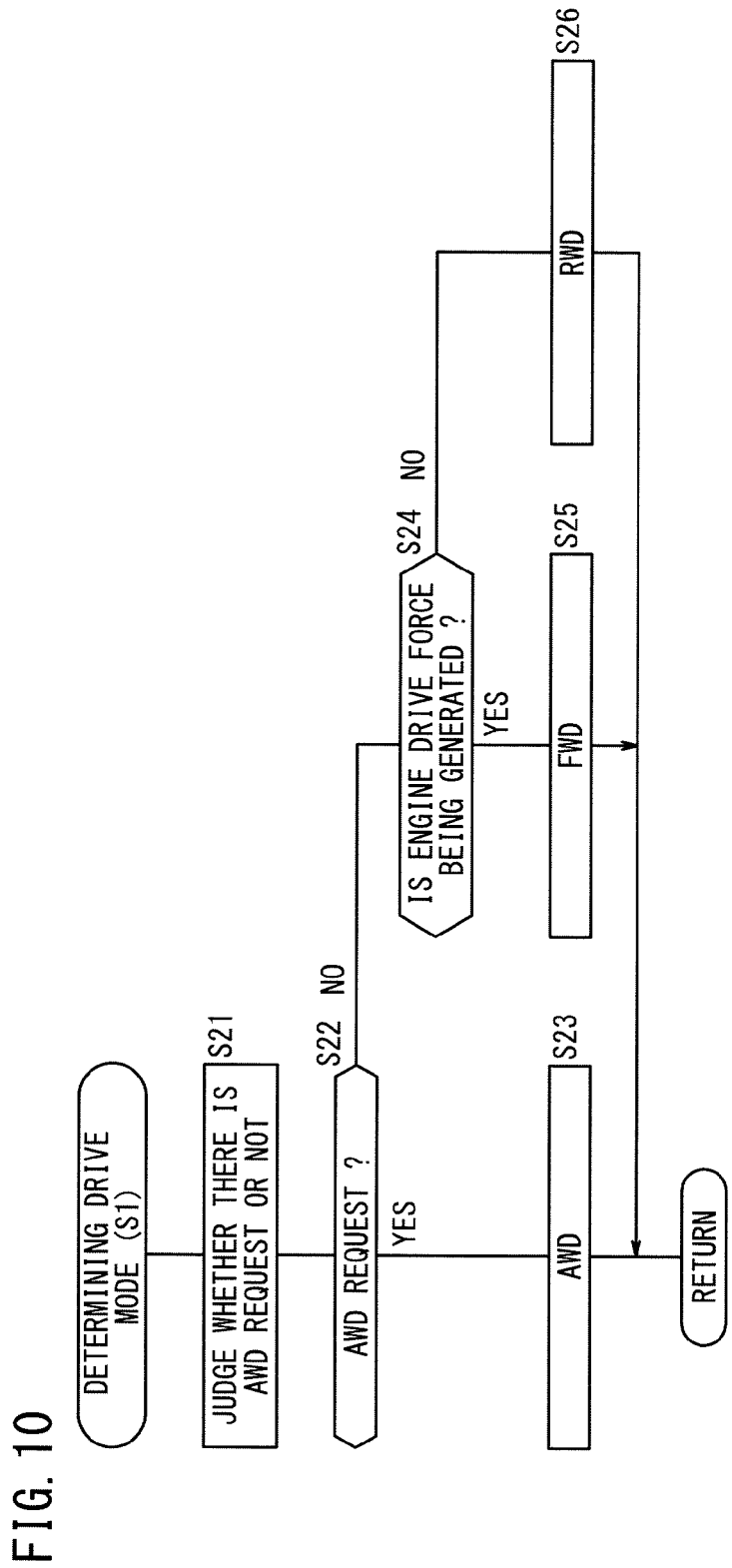
FIG. 10 is a flowchart of a processing sequence according to a modification of the processing sequence of FIG. 8.

FIG. 10 is a flowchart of a processing sequence according to a modification of FIG. 8. In step S21 of FIG. 10, the map switcher 262 of the drive ECU 28 judges whether or not there is an AWD mode request. An AWD mode request is made by the drive ECU 28 when the vehicle 10 is judged to be making a turn, slipping, or moving uphill. The AWD mode request is entered as an output signal from the drive mode controller 260 of the drive ECU 28.

If there is an AWD mode request (step S22: YES), then in step S23, the map switcher 262 decides that the vehicle 10 is presently in the AWD mode. If there is no AWD mode request (step S22: NO), then the map switcher 262 determines whether or not the engine 12 is generating a drive force (hereinafter referred to as an "engine drive force Fe"). Since the engine 12 applies the drive force to the front wheels 32 (see FIG. 1), the vehicle 10 is judged as being presently in the FWD mode if the engine drive force Fe is generated. The map switcher 262 determines whether or not the engine 12 is generating an engine drive force Fe based on an output signal from the drive mode controller 260. According to the modification shown in FIG. 9, in which the engine 12 applies the engine drive force Fe to the rear wheels 36, the vehicle 10 is judged as being presently in the RWD mode if the engine drive force Fe is generated.

If the engine is generating an engine drive force Fe (step S24: YES), then in step S25, the map switcher 262 decides that the vehicle 10 is presently in the FWD mode. If the engine is not generating an engine drive force Fe (step S24: NO), then in step S26, the map switcher 262 decides that the vehicle 10 is presently in the RWD mode.

E-2. Calculating q-axis Current Target Value Iq_t:
(2-1. Damper Control)

In the above embodiment, the damper control process carried out by the damper controller 244 uses the vehicle speed Vs and the steering angle change Δθs. However, alternatively, the damper control process may use the temporal derivative of the electric angle θ (electric angular velocity ω) instead of the steering angle change Δθs.

(2-2. Target Base Current Ibase and Corrective Current Ic)

In the above embodiment (FIG. 6), the q-axis current target value Iq_t is calculated by adding the corrective current Ic to the target base current Ibase. However, the q-axis current target value Iq_t may be calculated by another arrangement, insofar as the control process for controlling the steering assistive force Fasi is changed upon switching between drive modes.

Figure 11:
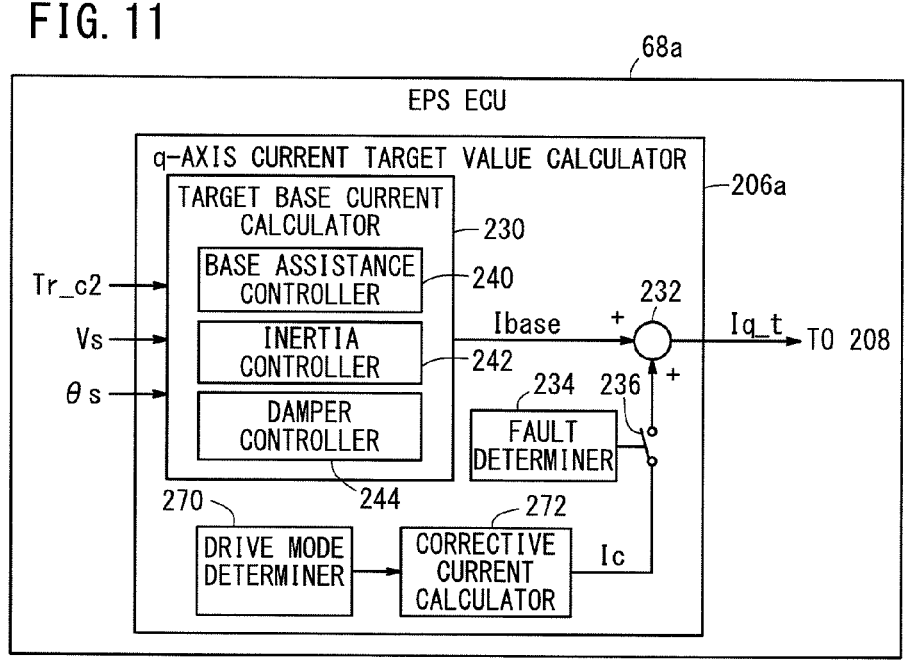
FIG. 11 is a block diagram of an arrangement (functional block) according to a first modification for calculating the q-axis current target value.

FIG. 11 is a block diagram of an arrangement (functional block) according to a first modification for calculating the q-axis current target value Iq_t. According to the first modification, the corrective current Ic is calculated by an electric power steering electronic control unit 68a (hereinafter referred to as an "EPS ECU 68a"). Parts of the EPS ECU 68a, which are identical to those according to the above embodiment (FIG. 6), are denoted by identical reference characters, and such features will not be described in detail below. The same holds true for the other modifications shown in FIGS. 12 through 14.

The EPS ECU 68a includes a q-axis current target value calculator 206a, which includes, in addition to a target base current calculator 230, an adder 232, a fault determiner 234, and an on-off switch 236, which are identical to those according to the above embodiment, together with a drive mode determiner 270 and a corrective current calculator 272. The drive mode determiner 270 determines one of the drive modes of the vehicle 10 based on an output signal from the drive ECU 28. The corrective current calculator 272 calculates and outputs a corrective current Ic based on the drive mode determined by the drive mode determiner 270. The corrective current Ic is either a fixed value or a variable value, which is set such that the corrective current Ic is greater in the FWD mode and smaller in the RWD mode. If the corrective current Ic is a variable value, then the corrective current Ic is variable depending on a numerical value related to a cornering force, e.g., a yaw rate or a lateral acceleration, for example.

Figure 12:
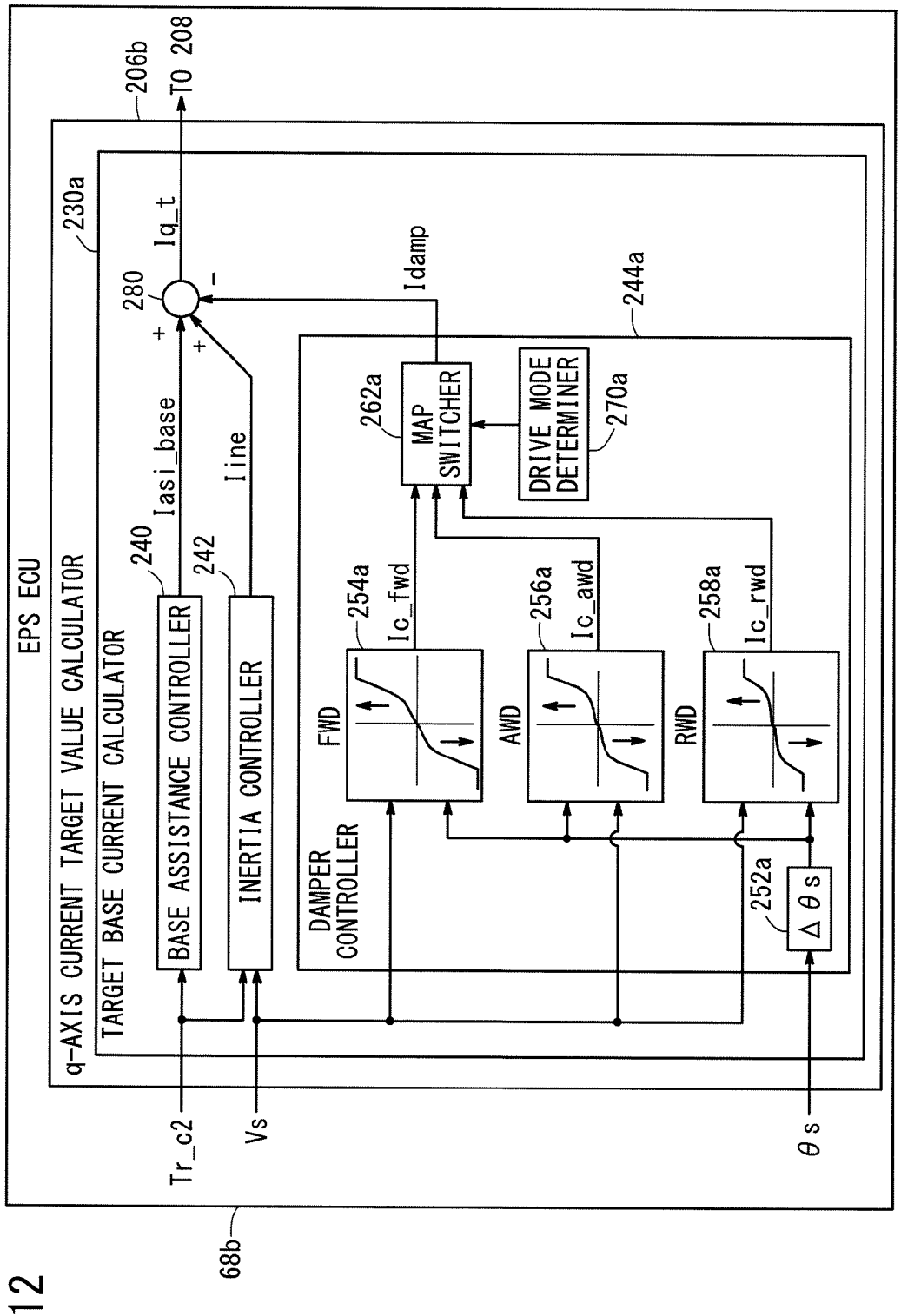
FIG. 12 is a block diagram of an arrangement (functional block) according to a second modification for calculating the q-axis current target value.

FIG. 12 is a block diagram of an arrangement (functional block) according to a second modification for calculating the q-axis current target value According to the second modification, an electric power steering electronic control unit 68b (hereinafter referred to as an "EPS ECU 68b") includes a damper controller 244a, which in a damper control process thereof, compensates for adverse effects caused by switching between drive modes of the vehicle 10.

In the above embodiment and in the first modification (FIG. 11), the target base current Ibase and the corrective current Ic are calculated separately and then are added to each other, thereby producing the q-axis current target value Iq_t. However, the EPS ECU 68b includes a q-axis current target value calculator 206b, which calculates the q-axis current target value Iq_t in a different way.

As shown in FIG. 12, the q-axis current target value calculator 206b includes a target base current calculator 230a, including a base assistance controller 240, an inertia controller 242, a damper controller 244a, and an adder/subtractor 280.

The damper controller 244a includes a steering angle change calculator 252a, an FWD control map 254a, an AWD control map 256a, an RWD control map 258a, a map switcher 262a, and a drive mode determiner 270a.

Each of the steering angle change calculator 252a, the FWD control map 254a, the AWD control map 256a, the RWD control map 258a, and the map switcher 262a are similar, respectively, to the steering angle change calculator 252, the FWD control map 254, the AWD control map 256, the RWD control map 258, and the map switcher 262 according to the above embodiment.

However, the maps 254a, 256a, 258a represent damping characteristic curves, which reflect damping characteristics of the damper control process carried out by the damper controller 244 according to the above embodiment. Stated otherwise, while the maps 254, 256, 258 according to the above embodiment serve to correct the damping characteristics of the damper controller 244, the maps 254a, 256a, 258a according to the second modification represent a combination of the damper controller 244 and the maps 254, 256, 258. Therefore, the output signal from the damper controller 244a, i.e., a damping corrective current Idamp, reflects a corrective current Ic.

The drive mode determiner 270a is identical to the drive mode determiner 270 according to the first modification.

FIG. 13 is a block diagram of an arrangement (functional block) according to a third modification for calculating the q-axis current target value Iq_t. According to the third modification, an electric power steering electronic control unit 68c (hereinafter referred to as an "EPS ECU 68c") includes an amplifier 290, which compensates for adverse effects caused by switching between drive modes of the vehicle 10.

In the above embodiment and in the first modification, the target base current Ibase and the corrective current Ic are calculated separately and then are added to each other, thereby producing the q-axis current target value Iq_t. However, the EPS ECU 68c includes a q-axis current target value calculator 206c, which corrects the target base current Ibase with a gain G1, i.e., multiplies the target base current Ibase by a predetermined coefficient, and then outputs the corrected target base current Ibase as the q-axis current target value Iq_t.

More specifically, similar to the drive mode determiner 270 according to the first modification, a drive mode determiner 270b of the q-axis current target value calculator 206c determines one of the drive modes of the vehicle 10, and then outputs the determined drive mode to the amplifier 290. The amplifier 290 changes the gain G1 depending on the determined drive mode of the vehicle 10. More specifically, when the vehicle 10 is in the FWD mode, the amplifier 290 changes the gain G1 so as to be greater than when the vehicle 10 is in the AWD mode and the RWD mode, thereby relatively increasing the q-axis current target value Iq_t. When the vehicle 10 is in the RWD mode, the amplifier 290 changes the gain G1 so as to be smaller than when the vehicle 10 is in the FWD mode and the AWD mode, thereby relatively reducing the q-axis current target value Iq_t.

Stated otherwise, according to the third modification, the amplifier 290 amplifies the target base current Ibase with a predetermined coefficient (gain G1), and uses different values for the gain G1 before and after the drive ECU 28 (drive mode control unit) switches between drive modes. Therefore, the steering correction upon switching between drive modes can be changed merely by changing the gain G1. Therefore, the above advantages can be achieved by incorporating small changes into the base assistance control process, the inertia control process, and the damper control process, which serve as basic control processes.

Figure 14:
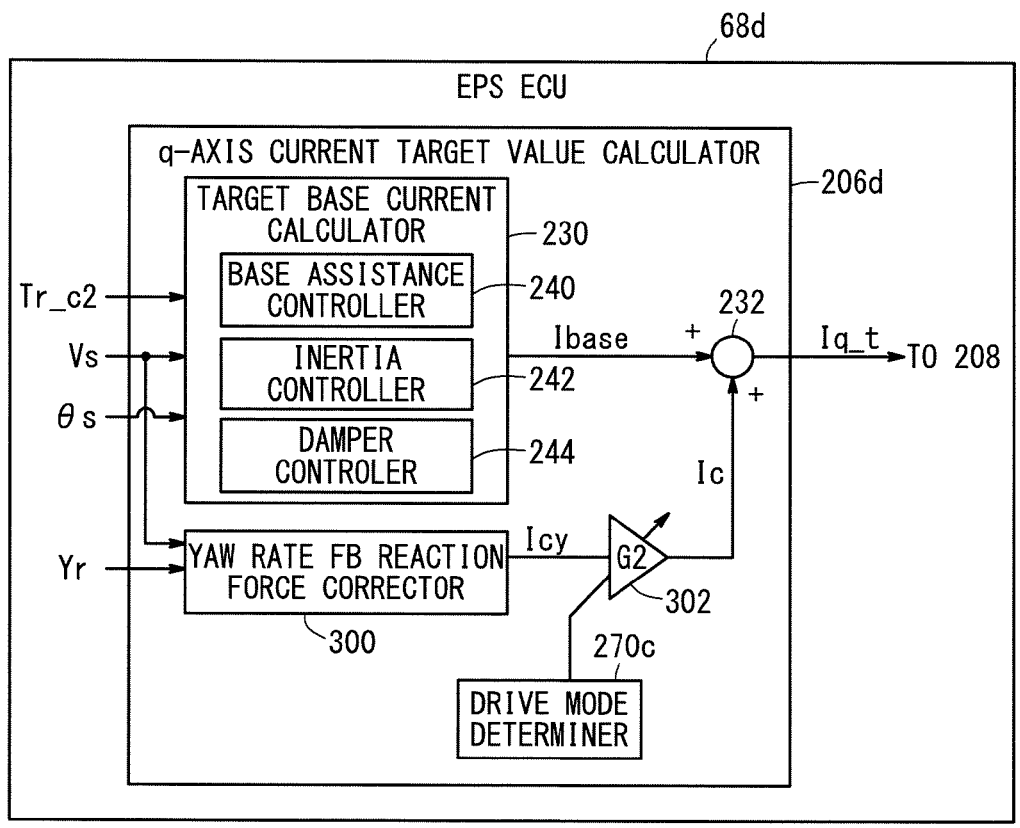
FIG. 14 is a block diagram of an arrangement (functional block) according to a fourth modification for calculating the q-axis current target value.

FIG. 14 is a block diagram of an arrangement (functional block) according to a fourth modification for calculating the q-axis current target value According to the fourth modification, an electric power steering electronic control unit 68d (hereinafter referred to as an "EPS ECU 68d") includes a q-axis current target value calculator 206d having, in addition to a target base current calculator 230 and an adder 232 which are identical to those of the above embodiment, a drive mode determiner 270c, a yaw rate feedback reaction force corrector 300 (hereinafter referred to as a "yaw rate FB reaction force corrector 300"), and an amplifier 302.

The yaw rate FB reaction force corrector 300 serves to control the EPS motor 60 in order to stabilize the behavior of the vehicle 10 during occurrences of understeering and oversteering. The yaw rate FB reaction force corrector 300 may have structural details similar to those disclosed in Japanese Laid-Open Patent Publication No. 2009-056994 (hereinafter referred to as "JP2009-056994A").

The yaw rate FB reaction force corrector 300 outputs a corrective current Icy based on the vehicle speed Vs from the vehicle speed sensor 64, and a yaw rate Yr from a yaw rate sensor (not shown).

Similar to the drive mode determiner 270b according to the third modification, the drive mode determiner 270c determines one of the drive modes of the vehicle 10, and then outputs the determined drive mode to the amplifier 302.

Similar to the amplifier 290 according to the third modification, the gain G2 of the amplifier 320 is changed depending on the determined drive mode of the vehicle 10. More specifically, when the vehicle 10 is in the FWD mode, the amplifier 320 makes the gain G2 greater than when the vehicle 10 is in the AWD mode and the RWD mode, thereby relatively increasing the corrective current Icy and outputting the corrective current Icy as the corrective current Ic. When the vehicle 10 is in the RWD mode, the amplifier 320 makes the gain G2 smaller than when the vehicle 10 is in the FWD mode and the AWD mode, thereby relatively reducing the corrective current Icy and outputting the corrective current Icy as the corrective current Ic. Conversely, when the vehicle 10 is in the RWD mode, the amplifier 320 makes the gain G2 greater than when the vehicle 10 is in the FWD mode and the AWD mode, thereby relatively increasing the corrective current Icy and outputting the corrective current Icy as the corrective current Ic. In this case, it is easy to stabilize the behavior of the vehicle 10 under a reaction force generated with feedback of the yaw rate Yr, at a time that the tendency of oversteering is strong in the RWD mode.

The yaw rate FB reaction force corrector 300 and the amplifier 302 may be included in an ECU rather than in the EPS ECU 68d.

(2-3. Process of Compensating for Adverse Effects Upon Switching Between Drive Modes)

In the above embodiment, the maps 254, 256, 258 are switched (FIG. 6). However, other arrangements may be used so long as such arrangements are capable of compensating for adverse effects that occur upon switching between drive modes of the vehicle 10, i.e., as long as such arrangements are capable of compensating for a change in the self-aligning torque. For example, the arrangement according to the first modification (FIG. 11) may be used.

In the above embodiment (in the maps 254, 256, 258 shown in FIG. 6), the corrective current Ic is established in order to correct the damping characteristics of the damper controller 244. However, the corrective current Ic may be used for other corrective purposes. For example, the corrective current Ic may be used to change other characteristics, such as control maps or the like, in other control processes including the base assistance control process, the inertia control process, etc., in order to compensate for adverse effects that occur upon switching between drive modes.

(2-4. Others)

In the above embodiment, when one of the FWD mode, the RWD mode, and the AWD mode changes to another mode, the control process for controlling the steering assistive force Fasi is changed in order to minimize a change in the self-aligning torque applied to the front wheels 32. However, the control process for controlling the steering assistive force Fasi may be changed in order to intensify a change in the self-aligning torque.

For example, when the FWD mode and the AWD mode are switched, the change in the self-aligning torque is relatively small. If the control process for controlling the steering assistive force Fasi is changed in order to intensify the change in the self-aligning torque, then it is possible to alert the driver concerning switching between the FWD mode and the AWD mode, to thereby allow the driver to steer the vehicle 10 more appropriately.

E-3. Steering Assistive Force Fasi:

In the above embodiment, the steering assistive force Fasi generated by the EPS motor 60 acts in the same direction as the force applied to the steering handle 52 by the driver, i.e., the steering torque. Stated otherwise, the steering assistive force Fasi is a force that increases the steering torque, and the increased steering torque, i.e., a steering assistive force or a power assistive force in a narrow sense, is applied to the front wheels 32. However, the steering assistive force Fasi generated by the EPS motor 60 may be any of other forces, insofar as such forces assist the driver in steering the vehicle 10 with the steering handle 52. For example, the steering assistive force Fasi may be a force that acts in an opposite direction to the steering torque, e.g., a reaction force.

Assisting the driver in steering the vehicle 10 with the steering handle 52 implies making it easy for the driver to turn the steering handle 52 in a desired direction, as with the above embodiment, as well as making it difficult for the driver to turn the steering handle 52 in a desired direction, provided that the EPS apparatus 50 is of the direct transmission type, in which the steering torque applied by the driver is directly transmitted to the steerable wheels, i.e., the front wheels 32.

The driver finds it difficult to turn the steering handle 52 in a desired direction when a reaction force is applied against the steering torque, so as to prevent the driver from turning the steering handle 52 excessively upon the occurrence of oversteering or understeering (see, for example, JP2009-056994A). In this case, when the vehicle 10 switches between the FWD mode and the RWD mode (first switching operation), between the AWD mode and the RWD mode (second switching operation), or between the AWD mode and the FWD mode (third switching operation), as described above, the reaction force may be increased or reduced in view of a change in the self-aligning torque.

If the EPS apparatus 50 is of a steer-by-wire type for controlling the reaction force applied from the EPS motor 60 to the steering handle 52 in order to impart a steering sensation to the driver, then the reaction force, which is controlled in this manner, corresponds to the steering assistive force Fasi. In this case, assisting the driver in steering the vehicle 10 with the steering handle 52 implies assisting in steering the vehicle 10 by controlling the reaction force when the driver turns the steering handle 52 in order to steer the vehicle 10, i.e., to adjust the direction of the front wheels 32.

A steer-by-wire type of EPS apparatus 50 adjusts a reaction force from the EPS motor 60 in order to achieve the same steering sensation as with a direct transmission type of EPS apparatus 50, for example. The aforementioned reaction force may include a reaction force that is applied against the steering torque in order to prevent the driver from turning the steering handle 52 excessively upon the occurrence of oversteering or understeering, as described above.

In the case that the present invention is applied to a steer-by-wire type of EPS apparatus 50, when the vehicle 10 switches between the FWD mode and the RWD mode (first switching operation), between the AWD mode and the RWD mode (second switching operation), or between the AWD mode and the FWD mode (third switching operation), as described above, the reaction force may be increased or reduced in view of a change in the self-aligning torque.

Although certain preferred embodiments of the present invention have been shown and described in detail, it should be understood that various changes and modifications may be made therein without departing from the scope of the appended claims.

What is claimed is:

1. A vehicle comprising:
a front wheel drive device for driving front wheels; a rear wheel drive device for driving rear wheels independently of the front wheel drive device;
a drive mode control unit for controlling the front wheel drive device and the rear wheel drive device to control drive modes of the front wheels and the rear wheels; and
a steering apparatus for steering steerable wheels, which are at least the front wheels or the rear wheels;
wherein the drive mode control unit performs at least one of:
a first switching operation of switching between a front-wheel-only-drive mode in which only the front wheels are driven, and a rear-wheel-only-drive mode in which only the rear wheels are driven;

a second switching operation of switching between the rear-wheel-only-drive mode, and a composite drive mode in which both the front wheels and the rear wheels are driven; and a third switching operation of switching between the composite drive mode and the front-wheel-only-drive mode; and the steering apparatus further comprises:

manual steering means that manually steers the steerable wheels;

assistive force generating means, which generates a steering assistive force acting in a same direction as or in an opposite direction to a steering force applied to the manual steering means, for assisting in steering the steerable wheels with the manual steering means; and assistive force control means that controls the steering assistive force; and when the drive mode control unit performs any one of the first switching operation, the second switching operation, and the third switching operation, the assistive force control means changes a control process thereof for controlling the steering assistive force, and wherein the drive mode control unit performs the first switching operation such that when the drive mode control unit changes from one of the front-wheel-only-drive mode and the rear-wheel-only-drive mode to the other mode, the drive mode control unit interposes the composite drive mode therebetween.

2. The vehicle according to claim 1, wherein the steering apparatus includes manually steered state acquiring means, which acquires an operated state of the manual steering means, and vehicle speed acquiring means, which acquires a vehicle speed of the vehicle;

wherein the assistive force control means:

calculates a target steering assistive quantity using a target base steering assistive quantity based on the operated state of the manual steering means and the vehicle speed, and a corrective quantity based on one of the drive modes; and when the drive mode control unit performs any one of the first switching operation, the second switching operation, and the third switching operation, the assistive force control means changes the corrective quantity, and calculates the target steering assistive quantity using the target base steering assistive quantity and the changed corrective quantity.

3. The vehicle according to claim 2, wherein the assistive force control means:

calculates a target base current depending on the target base steering assistive quantity and a corrective current depending on the corrective quantity;

adds the corrective current to the target base current thereby to calculate a target current depending on the target steering assistive quantity; and controls the assistive force generating means based on the target current.

4. The vehicle according to claim 2, wherein the assistive force control means further comprises an amplifier for amplifying the target base steering assistive quantity with a predetermined coefficient; and the amplifier uses different values for the predetermined coefficient before and after the drive mode control unit performs any one of the first switching operation, the second switching operation, and the third switching operation.

5. The vehicle according to claim 1, wherein the assistive force control means:

controls the assistive force generating means using control maps, which represent control quantities for an operated state of the manual steering means; and uses different ones of the maps before and after the drive mode control unit performs any one of the first switching operation, the second switching operation, and the third switching operation.

6. The vehicle according to claim 1, wherein the front wheels comprise the steerable wheels, and the rear wheels comprise non-steerable wheels.

7. The vehicle according to claim 6, wherein, when the drive mode control unit performs the first switching operation, the assistive force control means changes the control process for controlling the steering assistive force in order to make the steering assistive force greater in the front-wheel-only-drive mode than in the rear-wheel-only-drive mode, when the drive mode control unit performs the second switching operation, the assistive force control means changes the control process for controlling the steering assistive force in order to make the steering assistive force greater in the composite drive mode than in the rear-wheel-only-drive mode, and when the drive mode control unit performs the third switching operation, the assistive force control means changes the control process for controlling the steering assistive force in order to make the steering assistive force greater in the front-wheel-only-drive mode than in the composite drive mode.

8. The vehicle according to claim 1, wherein when the drive mode control unit changes from one of the front-wheel-only-drive mode and the rear-wheel-only-drive mode to the other mode, a drive force applied to one of the front wheels and the rear wheels, which are to stop being driven, is progressively reduced, and a drive force applied to one of the front wheels and the rear wheels, which start being driven, is progressively increased.

9. The vehicle according to claim 8, wherein in the composite drive mode while changing from one of the front-wheel-only-drive mode and the rear-wheel-only-drive mode to the other mode, a total of the drive force applied to one of the front wheels and the rear wheels, which are to stop being driven, and the drive force applied to one of the front wheels and the rear wheels, which start being driven, is kept constant.

10. A steering apparatus for use in a vehicle including a front wheel drive device for driving front wheels, a rear wheel drive device for driving rear wheels independently of the front wheel drive device, and a drive mode control unit for controlling the front wheel drive device and the rear wheel drive device to control drive modes of the front wheels and the rear wheels, wherein the drive mode control unit performs at least one of:

a first switching operation of switching between a front-wheel-only-drive mode in which only the front wheels are driven and a rear-wheel-only-drive mode in which only the rear wheels are driven;

a second switching operation of switching between the rear-wheel-only-drive mode, and a composite drive mode in which both the front wheels and the rear wheels are driven; and a third switching operation of switching between the composite drive mode and the front-wheel-only-drive mode; and the steering apparatus further comprises:

manual steering means that manually steers steerable wheels, which are at least the front wheels or the rear wheels;

assistive force generating means, which generates a steering assistive force acting in a same direction as or in an opposite direction to a steering force applied to the manual steering means, for assisting in steering the steerable wheels with the manual steering means; and assistive force control means that controls the steering assistive force; and when the drive mode control unit performs any one of the first switching operation, the second switching operation, and the third switching operation, the assistive force control means changes a control process thereof for controlling the steering assistive force, and wherein the drive mode control unit performs the first switching operation such that when the drive mode control unit changes from one of the front-wheel-only-drive mode and the rear-wheel-only-drive mode to the other mode, the drive mode control unit interposes the composite drive mode therebetween.

11. A steering apparatus for use in a vehicle including a front wheel drive device for driving front wheels, a rear wheel drive device for driving rear wheels independently of the front wheel drive device, and a drive mode control unit for controlling the front wheel drive device and the rear wheel drive device to control drive modes of the front wheels and the rear wheels, wherein the drive mode control unit performs at least one of:

a first switching operation of switching between a front-wheel-only-drive mode in which only the front wheels are driven and a rear-wheel-only-drive mode in which only the rear wheels are driven;

a second switching operation of switching between the rear-wheel-only-drive mode, and a composite drive mode in which both the front wheels and the rear wheels are driven; and a third switching operation of switching between the composite drive mode and the front-wheel-only-drive mode; and the steering apparatus further comprises:

manual steering device that manually steers steerable wheels, which are at least the front wheels or the rear wheels;

assistive force generator, which generates a steering assistive force acting in a same direction as or in an opposite direction to a steering force applied to the manual steering device, for assisting in steering the steerable wheels with the manual steering device; and assistive force controller that controls the steering assistive force; and when the drive mode control unit performs any one of the first switching operation, the second switching operation, and the third switching operation, the assistive force controller changes a control process thereof for controlling the steering assistive force, and wherein the drive mode control unit performs the first switching operation such that when the drive mode control unit changes from one of the front-wheel-only-drive mode and the rear-wheel-only-drive mode to the other mode, the drive mode control unit interposes the composite drive mode therebetween.

12. A method for controlling a vehicle including a front wheel drive device for driving front wheels, a rear wheel drive device for driving rear wheels independently of the front wheel drive device, a drive mode control computer for controlling the front wheel drive device and the rear wheel drive device to control drive modes of the front wheels and the rear wheels, and a steering apparatus including a manual steering device that manually steers steerable wheels which are at least the front wheels or the rear wheels, wherein the method comprising:

(i) performing, by the drive mode control computer, at least one of:

a first switching operation of switching between a front-wheel-only-drive mode in which only the front wheels are driven and a rear-wheel-only-drive mode in which only the rear wheels are driven;

a second switching operation of switching between the rear-wheel-only-drive mode, and a composite drive mode in which both the front wheels and the rear wheels are driven; and a third switching operation of switching between the composite drive mode and the front-wheel-only-drive mode; and (ii) generating a steering assistive force acting in a same direction as or in an opposite direction to a steering force applied to the manual steering device for assisting in steering the steerable wheels with the manual steering device, and controlling, by a computer, the steering assistive force wherein a control process in controlling the steering assistive force is changed when performing any one of the first switching operation, the second switching operation, and the third switching operation, wherein when the first switching operation changes from one of the front-wheel-only-drive mode and the rear-wheel-only-drive mode to the other mode, the drive mode control computer interposes the composite drive mode therebetween.

* * * * *